USO11335031B2

(12) United States Patent
Higginbottom et al.

(10) Patent No.: US 11,335,031 B2
(45) Date of Patent: May 17, 2022

(54) IMAGE DATA DECOMPRESSION

(71) Applicant: Imagination Technologies Limited, Kings Langley (GB)

(72) Inventors: Paul Higginbottom, Sydney (AU); Mark Jackson Pulver, Sydney (AU); Seyed Ahamed, Sydney (AU)

(73) Assignee: Imagination Technologies Limited, Kings Langley (GB)

( * ) Notice: Subject to any disclaimer, the term of this patent is extended or adjusted under 35 U.S.C. 154(b) by 42 days.

(21) Appl. No.: 17/000,550

(22) Filed: Aug. 24, 2020

(65) Prior Publication Data
US 2021/0074026 A1 Mar. 11, 2021

(30) Foreign Application Priority Data

Aug. 23, 2019 (GB) ..................................... 1912183
Aug. 23, 2019 (GB) ..................................... 1912184
(Continued)

(51) Int. Cl.
*G06K 9/36* (2006.01)
*G06T 9/00* (2006.01)
(Continued)

(52) U.S. Cl.
CPC .................. *G06T 9/00* (2013.01); *G06F 7/50* (2013.01); *G06F 7/727* (2013.01); *G06T 3/40* (2013.01)

(58) Field of Classification Search
CPC .... G06T 9/00; G06T 9/20; G06T 7/50; G06T 7/80; G06T 7/13; G06T 7/0002;
(Continued)

(56) References Cited

U.S. PATENT DOCUMENTS 10,230,982 B2 * 3/2019 Takami ................ H04N 19/593
2007/0297501 A1 * 12/2007 Hussain ............... H04N 19/176
375/240
(Continued)

FOREIGN PATENT DOCUMENTS

EP 3059964 A1 8/2016

*Primary Examiner* — Duy M Dang
(74) *Attorney, Agent, or Firm* — Potomac Law Group, PLLC; Vincent M DeLuca

(57) ABSTRACT

A method and decompression unit for performing decompression to determine image element values from compressed data representing a block of image element values each comprising one or more data values relating to a respective one or more channels. An indication of an origin value for each of the channels is read from the compressed data. For each of the channels, an indication of a first number of bits for representing difference values between the data values and the origin value for the channel is read from the compressed data. For each of the one or more channels, a second number of bits is obtained, wherein representations of the difference values for each of the channels are included in the compressed data using the second number of bits for that channel. The obtained second numbers of bits for the respective channels are used to read the representations of the difference values for the image element values being decompressed from the compressed data. Based on the representations of the difference values read from the compressed data, for each of the channels and for each of the image element values being decompressed, a difference value is determined in accordance with the first number of bits for the channel. For each of the one or more channels, the data value relating to the channel for each of the image element values being decompressed is determined using: (i) the origin value for the channel, and (ii) the determined difference value for the channel for the image element value.

20 Claims, 7 Drawing Sheets

(30) Foreign Application Priority Data

| Sep. 5, 2019 | (GB) | 1912795 |
|---|---|---|
| Sep. 5, 2019 | (GB) | 1912800 |
| Mar. 31, 2020 | (GB) | 2004715 |
| Mar. 31, 2020 | (GB) | 2004716 |

(51) Int. Cl.
*G06F 7/50* (2006.01)
*G06F 7/72* (2006.01)
*G06T 3/40* (2006.01)

(58) Field of Classification Search
CPC ... G06T 3/40; G06T 1/60; G06T 3/602; G06F 7/727; G06K 9/36; H04N 19/00278; H04N 19/00951; H04N 7/26; H04N 19/00587; H04N 19/0063; H04N 5/23251; H04N 19/136; H04N 19/124; H04N 19/12; H04N 19/126; H04N 19/15; H04N 19/176; H04N 19/115; H04N 19/119; H04N 19/42; H04N 1/41; H04N 1/64; H04N 19/00; H04N 19/186; H04N 19/20; H04N 19/423; H04N 19/90; H04N 19/96

See application file for complete search history.

(56) References Cited

U.S. PATENT DOCUMENTS

| 2009/0257485 | A1 | 10/2009 | Youn | |
|---|---|---|---|---|
| 2013/0176431 | A1 | 7/2013 | Ogawa et al. | |
| 2014/0348437 | A1 | 11/2014 | Okamoto | |
| 2017/0278215 | A1* | 9/2017 | Appu | G06T 1/60 |
| 2018/0014021 | A1* | 1/2018 | Midtskogen | H04N 19/157 |
| 2018/0160129 | A1 | 6/2018 | Kalevo et al. | |
| 2018/0247388 | A1 | 8/2018 | Chan et al. | |
| 2018/0293778 | A1* | 10/2018 | Appu | G06T 9/00 |
| 2019/0246117 | A1 | 8/2019 | Hugosson et al. | |

* cited by examiner

IMAGE DATA DECOMPRESSION

FIELD

This disclosure relates to data compression and data decompression.

BACKGROUND

Data compression, both lossless and lossy, is desirable in many applications in which data is to be stored in, and/or read from memory. By compressing data before storage of the data in memory, the amount of data transferred to the memory may be reduced. An example of data for which data compression is particularly useful is image data. The term 'image data' is used herein to refer to two-dimensional data that has values corresponding to respective pixel or sample locations of an image. For example, the image may be produced as part of a rendering process on a Graphics Processing Unit (GPU). Image data may include, but is not limited to, depth data to be stored in a depth buffer, pixel data (e.g. colour data) to be stored in a frame buffer, texture data to be stored in a texture buffer, surface normal data to be stored in a surface normal buffer and lighting data to be stored in a lighting buffer. These buffers may be any suitable type of memory, such as cache memory, separate memory subsystems, memory areas in a shared memory system or some combination thereof.

A GPU may be used to process data in order to generate image data. For example, a GPU may determine pixel values (e.g. colour values) of an image to be stored in a frame buffer which may be output to a display. GPUs usually have highly parallelised structures for processing large blocks of data in parallel. There is significant commercial pressure to make GPUs (especially those intended to be implemented on mobile/embedded devices) operate with reduced latency, reduced power consumption and with a reduced physical size, e.g. a reduced silicon area. Competing against these aims is a desire to use higher quality rendering algorithms to produce higher quality images. Reducing the memory bandwidth (i.e. reducing the amount of data transferred between the GPU and a memory can significantly reduce the latency and the power consumption of the system, which is why compressing the data before transferring the data can be particularly useful. The same is true, to a lesser extent, when considering data being moved around within the GPU itself. Furthermore, the same issues may be relevant for other processing units, e.g. central processing units (CPUs), as well as GPUs.

FIG. 1 shows an example graphics processing system 100 which may be implemented in an electronic device, such as a mobile/embedded device. The graphics processing system 100 comprises a GPU 102 and a memory 104 (e.g. graphics memory). Data, which may be compressed data, can be transferred in either direction, between the GPU 102 and the memory 104.

The GPU 102 comprises processing logic 106, a memory interface 108, a compression unit 110, and a decompression unit 112. In some examples, the compression and decompression units may be combined into a single unit which can perform both compression and decompression.

In operation, the GPU 102 may process regions of image data individually. The regions may for example represent rectangular (including square) portions (or "tiles") of the rendering space (i.e. the two-dimensional space representing, for example, an image area to be rendered). The processing logic 106 may perform rasterization of graphics primitives, such as, but not limited to, triangles and lines, using known techniques such as depth testing and texture mapping. The processing logic 106 may contain cache units to reduce memory traffic. Some data is read or written by the processing logic 106, from or to the memory 104 via the memory interface 108. In the example shown in FIG. 1, data which is being written from the processing logic 106 to the memory 104 is passed from the processing logic 106 to the memory interface 108 via the compression unit 110. The compression unit 110 may compress the data before passing it to the memory interface. Similarly, in the example shown in FIG. 1, data which is being read from the memory 104 by the processing logic 106 is passed from the memory interface 108 to the processing logic 106 via the decompression unit 112. The decompression unit 112 may decompress the data (if it was compressed) before passing it to the processing logic 106. The use of the compression unit 110 and the decompression unit 112 means that compressed data can be passed between the memory interface 108 and the memory 104, thereby reducing the amount of data that is to be transferred across the external memory bus to the memory 104.

As is known to a person of skill in the art, the processing logic 106 of the GPU 102 may generate a set of one or more colour values (e.g. RGB or RGBA) for each pixel in the render space and cause the colour values to be stored in the frame buffer (e.g. in the memory 104). The collection of colour values for a frame may be referred to herein as colour data or image data. The processing logic 106 may also generate other image data, such as depth data, surface normal data, lighting data, etc., and may store those image data values in one or more buffers in memory. These buffers may, in some cases, be referred to as frame buffers, while in other cases the term "frame buffer" may be reserved for buffers which store colour values or which store data to be sent to a display. In some graphics rendering systems the image data values stored in a buffer for a particular render may be used by the processing logic 106 when performing one or more subsequent renders. For example, colour values generated by one render may represent a texture which can be stored in memory 104 (e.g. in a compressed form), and the texture can be read from the memory 104 (e.g. and decompressed) to be applied as a texture to a surface in one or more subsequent renders. Similarly, surface normal values generated for a geometric model in one render may be used to apply lighting effects to the same model during the rendering of one or more subsequent renders. Furthermore, surface depth values generated and stored in one render can be read back in for use in the rendering of one or more subsequent renders for the same model.

Since the image data (e.g. colour data) can be quite large the memory bandwidth associated with writing image data to a buffer in memory and reading the image data from the buffer in memory may be a significant portion of the total memory bandwidth of the graphics processing system and/or the GPU. As a result, the image data is often compressed, via the compression unit 110, prior to being stored in a buffer and decompressed, via the decompression unit 112, after being read from the buffer.

When a lossless compression technique is used to compress data and then a complementary lossless decompression technique is used to decompress the data, the original data can be recovered, with no loss of data (assuming no errors occurred during the compression or decompression processes). The extent to which the data is compressed can be expressed as a compression ratio, where the compression ratio is given by dividing the size of the uncompressed data by the size of the compressed data. The compression ratio achieved by a lossless compression technique typically depends upon the data that is being compressed. For example, lossless compression techniques tend to be able to achieve relatively high compression ratios when compressing highly correlated data; whereas lossless compression techniques tend to achieve relatively low compression ratios when compressing uncorrelated (e.g. random) data. Therefore, it is difficult to guarantee that a lossless compression technique will achieve a particular compression ratio (e.g. a compression ratio of 2:1). Therefore, if only a lossless compression technique is used then the system typically must be able to handle situations in which a desired compression ratio (e.g. 2:1) is not achieved, and for example, sometimes no compression at all results from using a lossless compression technique.

In some situations, a guaranteed compression ratio can be considered more important than a guarantee that no data will be lost during the compression. For example, a guaranteed compression ratio allows a reduction in a memory footprint that is necessary to ensure that a compressed block of data can be stored. Having a guaranteed compression ratio may allow the size (e.g. silicon area) of the memory 104 to be reduced. In these situations, a lossy compression technique can be used, which can achieve a guaranteed compression ratio, although some data may be lost during the compression process.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a computer-implemented method of performing decompression to determine one or more image element values from compressed data, wherein the compressed data represents a block of image data comprising a plurality of image element values, each image element value comprising one or more data values relating to a respective one or more channels, the method comprising:
  reading, from the compressed data, an indication of an origin value for each of the one or more channels;
  reading, from the compressed data, for each of the one or more channels, an indication of a first number of bits for representing difference values which represent differences between the data values and the origin value for the channel;
  obtaining, for each of the one or more channels, a second number of bits, wherein representations of the difference values for each of the one or more channels are included in the compressed data using the second number of bits for that channel;
  using the obtained one or more second numbers of bits for the respective one or more channels to read the representations of the difference values for the one or more image element values being decompressed from the compressed data;
  based on the representations of the difference values read from the compressed data, determining, for each of the one or more channels and for each of the one or more image element values being decompressed, a difference value in accordance with said first number of bits for the channel; and
  for each of the one or more channels, determining the data value relating to the channel for each of the one or more image element values being decompressed using: (i) the origin value for the channel, and (ii) the determined difference value for the channel for the image element value.

Said determined difference value for a channel for an image element value may have said first number of bits for the channel.

Said determining, for each of the one or more channels and for each of the one or more image element values being decompressed, a difference value in accordance with said first number of bits for the channel may comprise adding zero, one or more least significant bits to the representations of the difference values read from the compressed data to thereby determine the difference values having said first number of bits for each of the one or more channels.

The zero, one or more least significant bits which are added to the representations of the difference values read from the compressed data may be all zeros.

The zero, one or more least significant bits which are added to the representations of the difference values read from the compressed data may be all ones.

The zero, one or more least significant bits which are added to the representations of the difference values for a channel read from the compressed data may be equal to a corresponding zero, one or more most significant bits of the origin value for the channel.

The zero, one or more least significant bits which are added to the representations of the difference values read from the compressed data may be random or pseudo-random bits.

The zero, one or more least significant bits which are added to the representations of the difference values for a channel read from the compressed data may be different for different ranges of origin values or for different ranges of difference values.

The one or more second numbers of bits may be determined to ensure that the compressed data satisfies a target level of compression for compressing the block of image data.

Said obtaining, for each of the one or more channels, a second number of bits may comprise using the first number of bits for each of the one or more channels to determine the second number of bits for the channel in accordance with a predetermined scheme.

Said using the first number of bits for each of the one or more channels to determine the second number of bits for the channel in accordance with the predetermined scheme may comprise determining whether representing the difference values for the one or more channels with the respective determined one or more first number of bits would satisfy the target level of compression, wherein if it is determined that representing the difference values for the one or more channels with the respective determined one or more first number of bits would satisfy the target level of compression then, for each of the one or more channels, the second number of bits may equal the first number of bits for that channel, and wherein if it is determined that representing the difference values for the one or more channels with the respective determined one or more first number of bits would not satisfy the target level of compression then, for at least one of the one or more channels, the second number of bits may be less than the first number of bits for that channel.

There may be a threshold number of bits for each of the one or more channels, wherein if a first number of bits for a channel is less than or equal to the threshold number of bits for the channel, then the second number of bits for the channel may equal the first number of bits for the channel, and wherein if a first number of bits for a channel is greater than the threshold number of bits for the channel, then the second number of bits for the channel may be within a range from the threshold number of bits for the channel to the first number of bits for the channel.

The threshold number of bits may be the same for each of the one or more channels. Alternatively, it might not be the case that the threshold number of bits is the same for each of the one or more channels.

Said obtaining, for each of the one or more channels, a second number of bits may comprise reading an indication of said second number of bits for the channel from the compressed data.

Said determining, for each of the one or more channels, the data value relating to the channel for each of the one or more image element values being decompressed may comprise summing the origin value for the channel and the determined difference value for the channel for the image element value.

Said determining, for each of the one or more channels, the data value relating to the channel for each of the one or more image element values being decompressed may comprise subtracting the determined difference value for the channel for the image element value from the origin value for the channel.

Said determining, for each of the one or more channels, the data value relating to the channel for each of the one or more image element values being decompressed may comprise combining the origin value for the channel and the determined difference value for the channel for the image element value using modular arithmetic.

The compressed data may comprise a plurality of origin values for at least one of the one or more channels, wherein an indication may be included in the compressed data to indicate which of the plurality of origin values each of the difference values for said at least one of the one or more channels has been determined from, wherein said determining, for said at least one of the one or more channels, the data value relating to the channel for each of the one or more image element values being decompressed may comprise using: (i) the origin value for the channel indicated by the indication for the determined difference value for the channel for the image element value, and (ii) the determined difference value for the channel for the image element value.

The compressed data may be in a compressed block of data comprising: a header portion, which has a fixed size, and which comprises the indication of the origin value and the indication of the first number of bits for each of the one or more channels; and a body portion, which has a variable size, and which comprises the representations of the difference values for each of the one or more channels.

The compressed block of data may have a base address, and wherein the header portion may start at a first address defined by the base address, with the data of the header portion running in a first direction from the first address, and wherein the body portion may start at a second address defined by the base address, with the data of the body portion running in a second direction from the second address, wherein the first direction is opposite to the second direction in address space.

Said one or more channels may comprise a plurality of channels. Said plurality of channels may comprise a Red channel, a Green channel, a Blue channel and an Alpha channel.

The method may further comprise performing recorrelation on the determined data values relating to the plurality of channels for each of the one or more image element values being decompressed to thereby introduce correlation between the different data values relating to the different channels of an image element value.

Said one or more channels may consist of a single channel.

The method may further comprise: determining one or more error correction indications based on the determined data values of the one or more image element values being decompressed;

reading one or more error correction indications from the compressed data; and comparing the determined one or more error correction indications with the one or more error correction indications read from the compressed data to determine whether there are errors in the determined data values of the one or more image element values being decompressed.

The image element values may be pixel values, texel values, depth values, surface normals or lighting values.

The method may further comprise outputting determined data values of the one or more image element values being decompressed for further processing.

The method may be performed using dedicated hardware.

There is provided a decompression unit configured to perform decompression to determine one or more image element values from compressed data, wherein the compressed data represents a block of image data comprising a plurality of image element values, each image element value comprising one or more data values relating to a respective one or more channels, the decompression unit comprising:
  data value determination logic configured to read, from the compressed data, an indication of an origin value for each of the one or more channels; and
  difference value determination logic configured to:
    read, from the compressed data, for each of the one or more channels, an indication of a first number of bits for representing difference values which represent differences between the data values and the origin value for the channel;
    obtain, for each of the one or more channels, a second number of bits, wherein representations of the difference values for each of the one or more channels are included in the compressed data using the second number of bits for that channel;
    use the obtained one or more second numbers of bits for the respective one or more channels to read the representations of the difference values for the one or more image element values being decompressed from the compressed data; and
    based on the representations of the difference values read from the compressed data, determine, for each of the one or more channels and for each of the one or more image element values being decompressed, a difference value in accordance with said first number of bits for the channel;
  wherein the data value determination logic is further configured to determine, for each of the one or more channels, the data value relating to the channel for each of the one or more image element values being decompressed using: (i) the origin value for the channel, and (ii) the determined difference value for the channel for the image element value.

There may be provided a decompression unit configured to perform any of the decompression methods described herein.

There may be provided a method of manufacturing, using an integrated circuit manufacturing system, a decompression unit as described herein, the method comprising: processing, using a layout processing system, a computer readable description of the compression unit so as to generate a circuit layout description of an integrated circuit embodying the decompression unit; and manufacturing, using an integrated circuit generation system, the decompression unit according to the circuit layout description.

There may be provided a computer-implemented method of compressing a block of image data to satisfy a target level of compression, wherein the block of image data comprises a plurality of image element values, each image element value comprising one or more data values relating to a respective one or more channels, the method comprising:
  for each of the one or more channels:
    determining an origin value for the channel for the block;
    determining difference values representing differences between the data values and the determined origin value for the channel for the block; and
    determining a first number of bits for losslessly representing a maximum difference value of the difference values for the channel for the block;
  using said determined first number of bits for each of the one or more channels to determine a respective one or more second number of bits for each of the one or more channels, the one or more second number of bits being determined such that representing each of the difference values for the one or more channels with said respective one or more second number of bits satisfies the target level of compression for compressing the block of image data; and
  forming compressed data, wherein the compressed data comprises, for each of the one or more channels:
    an indication of the determined origin value for the channel;
    an indication of said determined first number of bits for the channel; and
    representations of the determined difference values for the channel, wherein each of the representations of the determined difference values for the channel uses said determined second number of bits for the channel, such that the target level of compression is satisfied.

There may be provided a compression unit configured to compress a block of image data to satisfy a target level of compression, wherein the block of image data comprises a plurality of image element values, each image element value comprising one or more data values relating to a respective one or more channels, the compression unit comprising:
  analyser logic configured to determine, for each of the one or more channels:
    an origin value for the channel for the block; and
    a first number of bits for losslessly representing a maximum difference value for the channel for the block;
  difference value determination logic configured to determine, for each of the one or more channels, difference values representing differences between the data values and the determined origin value for the channel for the block;
  difference value size determination logic configured to use said determined first number of bits for each of the one or more channels to determine a respective one or more second number of bits for each of the one or more channels, the one or more second number of bits being such that representing each of the difference values for the one or more channels with said respective one or more second number of bits satisfies the target level of compression for compressing the block of image data; and
  compressed data formation logic configured to form compressed data, wherein the compressed data comprises, for each of the one or more channels:
    an indication of the determined origin value for the channel;
    an indication of said determined first number of bits for the channel; and
    representations of the determined difference values for the channel, wherein each of the representations of the determined difference values for the channel uses said determined second number of bits for the channel, such that the target level of compression is satisfied.

The compression unit and/or decompression unit may be embodied in hardware on an integrated circuit. There may be provided a method of manufacturing, at an integrated circuit manufacturing system, the compression unit and/or decompression unit. There may be provided an integrated circuit definition dataset that, when processed in an integrated circuit manufacturing system, configures the system to manufacture the compression unit and/or decompression unit. There may be provided a non-transitory computer readable storage medium having stored thereon a computer readable description of an integrated circuit that, when processed in an integrated circuit manufacturing system, causes the integrated circuit manufacturing system to manufacture an integrated circuit embodying the compression unit and/or decompression unit.

There may be provided an integrated circuit manufacturing system comprising: a non-transitory computer readable storage medium having stored thereon a computer readable integrated circuit description that describes the compression unit and/or decompression unit; a layout processing system configured to process the integrated circuit description so as to generate a circuit layout description of an integrated circuit embodying the compression unit and/or decompression unit; and an integrated circuit generation system configured to manufacture the compression unit and/or decompression unit according to the circuit layout description.

There may be provided computer program code for performing a method as described herein. In other words, there may be provided computer readable code configured to cause any of the methods described herein to be performed when the code is run. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

The present invention is described by way of example with reference to the accompanying drawings. In the drawings.

Figure 1:
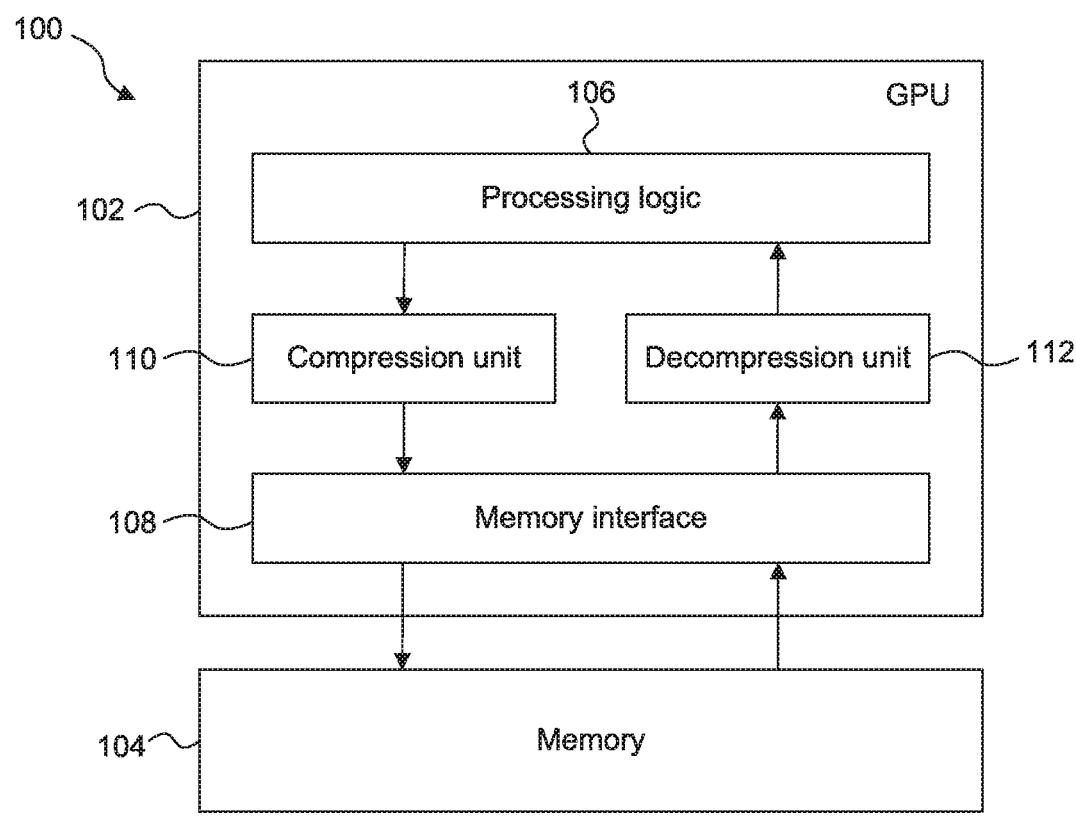
FIG. 1 shows a graphics processing system in which a compression unit and a decompression unit are implemented within a graphics processing unit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, it can be useful to have a compression technique (and a complementary decompression technique) which is guaranteed to satisfy a target level of compression (e.g. guaranteed to satisfy a compression ratio, such as 2:1) without too much loss in quality of the data, e.g. without visually perceptible artefacts being introduced into an image due to loss introduced by the compression. A target level of compression is satisfied if the compression ratio achieved is equal to or greater than that of the target level. Some previous high-end lossy compression algorithms can achieve fixed compression ratios without too much loss in quality of the data, but these previous high-end lossy compression algorithms involve performing complex operations (such as filtering, multiplication and division operations) on floating point or fixed point values and may require internal buffering of values during the compression process. As such, these previous high-end lossy compression algorithms are often considered unsuitable for use in small, low cost and/or low power computing systems, such as may be implemented in mobile devices such as smart phones and tablets or other devices where size, cost and/or power are particularly constrained.

Examples of compression and decompression techniques are described herein which are guaranteed to satisfy a target level of compression (e.g. satisfy a fixed compression ratio, such as 2:1) without too much loss in quality of the data (e.g. without significant visually perceptible artefacts being introduced into the image due to loss introduced by the compression), and can be implemented in a small, low cost and low power computing system. The examples described herein are simple to implement. For example, they may operate on image element values in an integer format rather than a floating point format, and they may be performed by performing simple operations such as addition operations, subtraction operations and compare operations, and without performing more complex operations (which may be expansive and/or expensive, e.g. in terms of the amount of data needed to represent the values, or the size of the hardware logic required to implement them) such as multiplication operations or division operations, and without requiring as much internal buffering of values during the compression or decompression process as in the previous high-end compression and decompression algorithms mentioned above. In these examples, these simple operations (e.g. addition operations, subtraction operations and compare operations) are "integer operations", meaning that they operate on integer numbers, e.g. operate on the image element values in the integer format.

The compression techniques described herein may be implemented in a compression unit implemented in dedicated hardware, e.g. using fixed-function circuitry. Similarly, the decompression techniques described herein may be implemented in a decompression unit implemented in dedicated hardware, e.g. using fixed-function circuitry. In these examples, the compression unit and the decompression unit may be small in terms of physical size (e.g. silicon area) when compared with previous high-end compression and decompression units implemented in hardware. The compression units and decompression units described herein are suitable for being implemented in a small, low-cost processing unit (e.g. a GPU or a CPU), with small silicon area and low power consumption and low latency. This is achieved without degrading the quality of the data (e.g. the image quality) too much.

Furthermore, the compression techniques described herein allow the compression to be lossless if this will satisfy the target level of compression for compressing a block of image data. However, if lossless compression of a block of image data would not satisfy the target level of compression then the compression becomes lossy in order to guarantee that the target level of compression is satisfied. In examples described herein, rather than having separate lossless and lossy compression units, a single compression unit can be used to perform either lossless or lossy compression to compress a block of image data. The use of a single compression unit for performing lossless and lossy compression can reduce the total hardware implemented in a device (e.g. it can reduce the silicon area implemented in a device) and may reduce the power consumption of the device compared to implementing separate units for lossless compression and for lossy compression. Similarly, in examples described herein, rather than having separate lossless and lossy decompression units, a single decompression unit can be used to perform either lossless or lossy decompression to compress a block of image data. The use of a single decompression unit for performing lossless and lossy decompression can reduce the total hardware implemented in a device (e.g. it can reduce the silicon area implemented in a device) and may reduce the power consumption of the device compared to implementing separate units for lossless decompression and for lossy decompression.

Figure 2:
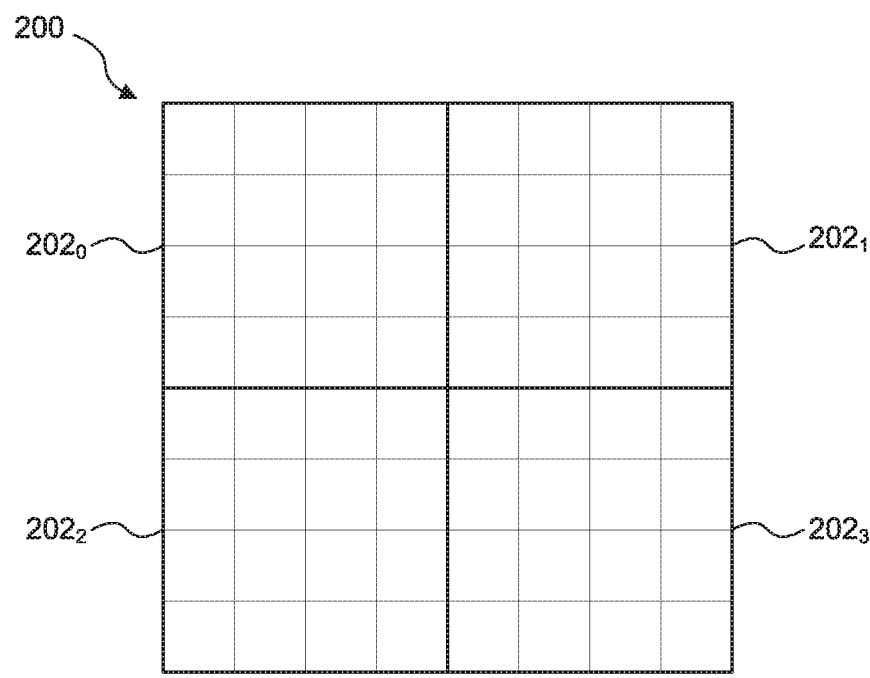
FIG. 2 shows an array of image data comprising blocks of image data.

Image data to be compressed can be represented as a 2D array of image element values (e.g. pixel values). Each of the image element values comprises one or more data values relating to a respective one or more channels. For example, there may be a plurality of channels, e.g. Red (R), Green (G), Blue (B) and Alpha (A) channels. FIG. 2 shows an array of image data 200 comprising blocks of image data. In this example, the array of image data 200 represents an image represented by pixel values, wherein the blocks of image data are 4×4 blocks of pixel values denoted $202_0$, $202_1$, $202_2$ and $202_3$ in FIG. 2. In other examples, the blocks of image data could be a different size and/or shape. Furthermore, in other examples, there may be more (or fewer) than four blocks of image data in an array of image data.

The examples described herein relate to compressing and decompressing a block of pixel values, wherein the pixel values represent an image. However, it is to be understood that pixel values are just one example of image element values which may be compressed using the techniques described herein. More generally, a block of image data can be compressed to form a compressed block of data, and a compressed block of data can be decompressed to form a block of image data, wherein the image data comprises a plurality of image element values. To give some examples, the image element values may be: (i) texel values representing a texture, (ii) pixel values representing an image, (iii) depth values representing depths of surfaces within a scene at different sample positions, (iv) surface normal values representing the directions of normal vectors of surfaces within a scene at different sample positions, or (v) lighting values representing lighting on surfaces within a scene at different sample positions. The lighting values represent a "light map". A light map can be considered to be a type of texture, such that it can be used and processed in the same way as a texture. Pixel values and texel values are examples of colour values (where pixel values represent an image and texel values represent a texture). These colour values may be monochromatic, i.e. they have a single colour channel. However, in some examples, colour values may be multi-channel values. For example, colour values may be in a RGB format wherein there is a Red channel (R), a Green channel (G) and a Blue channel (B). In other examples, colour values may be in a RGBA format wherein there is a Red channel (R), a Green channel (G), a Blue channel (B) and an Alpha channel (A). In other examples, colour values may be in a YCbCr format wherein they have a luma channel (Y), a first chroma channel (Cb) and a second chroma channel (Cr). As is known in the art, there are many other formats that multi-channel colour values may have. Each channel of the multi-channel colour values comprises values which relate to that particular channel. In the examples described herein, when we refer to "pixel values" we may be referring to the values of one of the channels of multi-channel colour values.

In examples described herein, the compressed data is stored as a compressed block of data. For example, the headers and difference values may be stored in the same contiguous block of compressed data. However, more generally, it is to be understood that the compressed data does not need to be stored as a block, e.g. as a contiguous block, of data. For example, the headers and the difference values may be stored separately, e.g. in separate sections of memory.

Compression

As an overview of the compression technique described herein, a block of image data is compressed to satisfy a target level of compression. The block of image data comprises a plurality of image element values, each image element value comprising one or more data values relating to a respective one or more channels. The data values within a block for a channel can be represented using an origin value and a difference value, wherein the origin value is common to all of the data values within the block for the channel, whereas the difference values are specific to each of the data values. The difference values for the data values within the block for a channel can each be represented with a first number of bits. This first number of bits is chosen such that the maximum difference value for the channel for the block can be represented losslessly using said first number of bits without any leading zeros. Indications of the origin value and the first number of bits for each of the channels for the block are included in a header portion of a compressed block of data. The header portion of the compressed block of data has a fixed size. Representations of the difference values are included in a body portion of the compressed block of data. The body portion of the compressed block of data does not have a fixed size (i.e. the size of the body portion of the compressed block of data is dependent upon the actual data being compressed), but the body portion of the compressed block of data does have a maximum size that will not be exceeded by the representations of the difference values stored in the body portion of the compressed block of data. The maximum size of the body portion depends upon the target level of compression. For each of the one or more channels, a second number of bits is determined based on the first numbers of bits for all of the one or more channels. For each of the one or more channels, each of the representations of the difference values for the channel is stored in the compressed block of data using the second number of bits for the channel. If using the first numbers of bits for the representations of the difference values in the compressed block of data will satisfy the target level of compression for compressing the block of image data, then the first numbers of bits are used for the representations of the difference values in the compressed block of data, i.e. for each of the one or more channels, the second number of bits is determined to be equal to the first number of bits for the channel. However, if using the first numbers of bits for the representations of the difference values in the compressed block of data will not satisfy the target level of compression for compressing the block of image data, then the second number of bits for at least one of the one or more channels is determined to be less than the first number of bits for that channel, to thereby ensure that storing the representations of the difference values in the compressed block of data using the second numbers of bits will satisfy the target level of compression.

Figure 3:
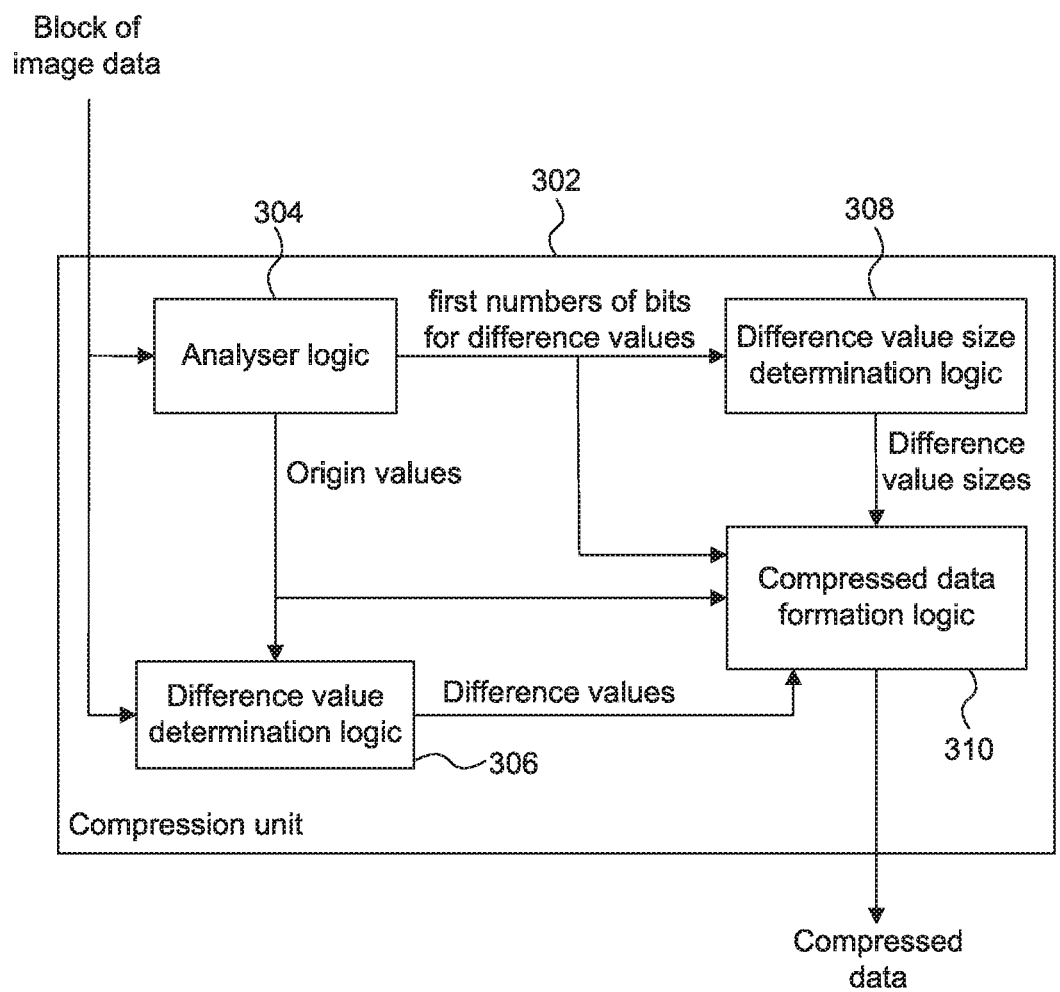
FIG. 3 shows a compression unit.

An example of a compression technique is now described with reference to FIGS. 3 and 4. FIG. 3 shows a compression unit 302 configured to perform compression on a block of image data. The compression unit 302 may be implemented as the compression unit 110 in the graphics processing system shown in FIG. 1. The compression unit 302 comprises analyser logic 304, difference value determination logic 306, difference value size determination logic 308 and compressed data formation logic 310. Each of the logic blocks 304 to 310 implemented in the compression unit 302 may be implemented in hardware (e.g. dedicated hardware implemented with fixed-function circuitry), software (e.g. as a software module executing on a processor), or a combination thereof. Implementing the logic blocks in hardware would normally provide a lower latency of operation than implementing the logic blocks in software. However, implementing the logic blocks in software allows more flexibility in terms of altering the functionality of the logic blocks after manufacture of the compression unit 302. So in some systems, a hardware implementation may be more suitable than a software implementation (e.g. when the compression needs to be performed quickly), whereas in some other systems, a software implementation may be more suitable than a hardware implementation (e.g. when the functionality of the compression unit needs to be variable).

Figure 4:
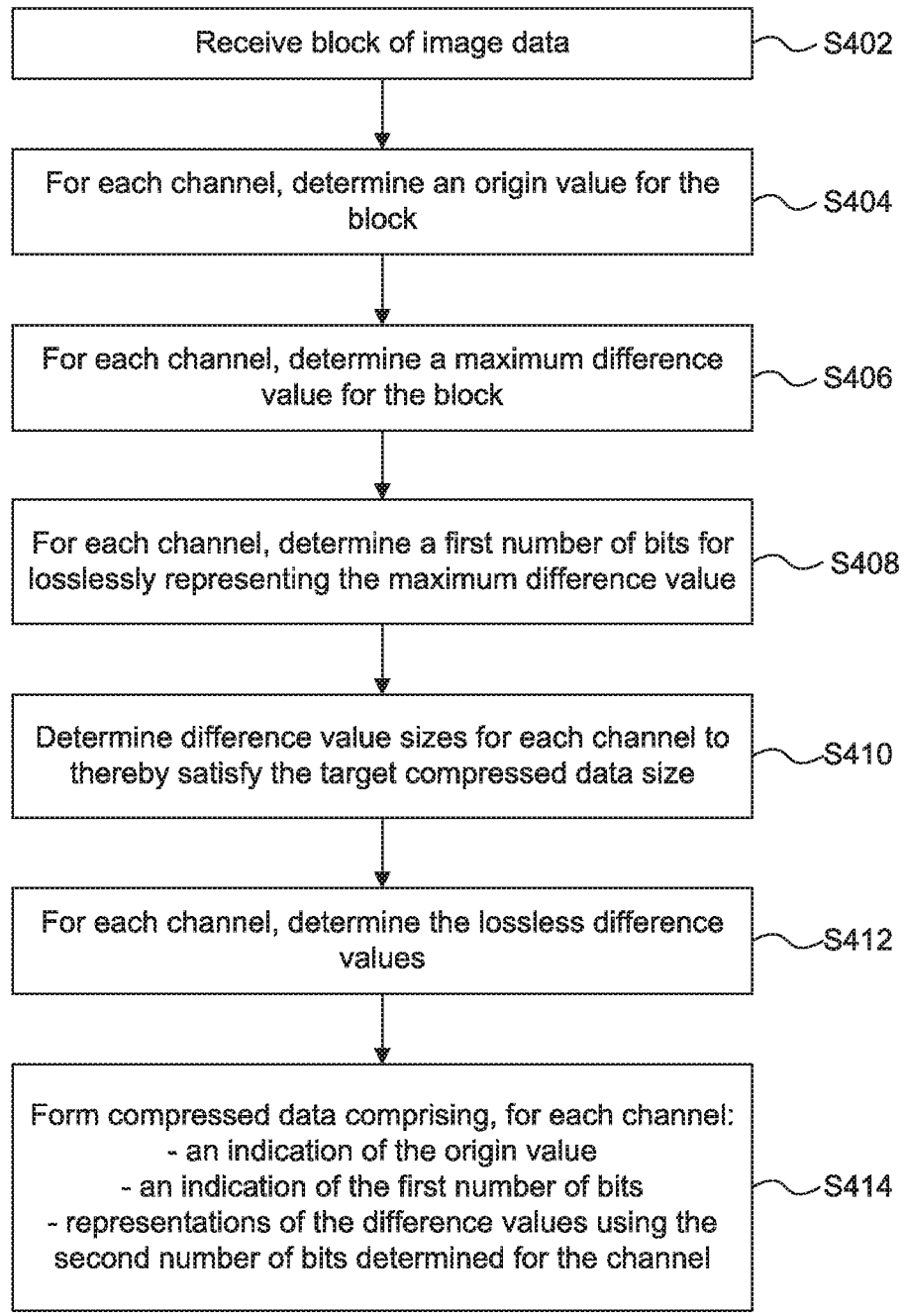
FIG. 4 is a flow chart for a method of compressing a block of image data to satisfy a target level of compression.

FIG. 4 shows a flow chart for a method of compressing a block of image data to satisfy a target level of compression using the compression unit 302.

In step S402 a block of image data is received at the compression unit 302. As described above, the block of image data comprises a plurality of image element values, each image element value comprising one or more data values relating to a respective one or more channels.

In step S404, the analyser logic 304 determines, for each of the one or more channels, an origin value for the channel for the block of image data. For example, the origin value for a channel may be determined by identifying a minimum of the data values relating to the channel for the block.

In step S406 the analyser logic 304 determines, for each of the one or more channels, a maximum difference value for the block. Difference values (which may also be referred to as "delta values") for a channel for the block represent the differences between the data values and the determined origin value for the channel for the block. The maximum difference value for a channel for the block can be determined by identifying the minimum and the maximum data value relating to the channel for the block and then subtracting the identified minimum data value from the identified maximum data value.

In step S408 the analyser logic 304 determines, for each of the one or more channels, a first number of bits. The determined first number of bits for a channel is a number. In particular, the determined first number of bits for a channel is a number of bits for losslessly representing the maximum difference value for the channel. In examples described herein, the determined first number of bits for a channel is the minimum number of bits which can be used to losslessly represent the determined maximum difference value for the channel. The term "compression format" may be used to refer to an indication of the one or more first numbers of bits determined for the one or more channels. The first number of bits for each of the one or more channels is determined by determining how many bits would be used to represent the maximum difference value obtained for the channel for the block without any leading zeros, wherein the determined number of bits is the first number of bits. It is noted that the first number of bits for a channel for a block is relevant for all of the data values relating to that channel for the block, rather than different data values relating to the channel within the block having different first numbers of bits determined for them.

The determined first number of bits for each of the one or more channels is passed to the difference value size determination logic 308. In step S410, the difference value size determination logic 308 uses (e.g. analyses) the determined first number of bits for each of the one or more channels to determine a respective one or more second number of bits for each of the one or more channels. The one or more second number of bits is determined such that (e.g. to ensure that) representing each of the difference values for the one or more channels with the respective one or more second number of bits satisfies the target level of compression for compressing the block of image data. The second number of bits is a number. In examples described herein, each of the one or more second numbers of bits for the respective one or more channels for the block is determined in dependence upon all of the one or more first numbers of bits for the respective one or more channels for the block. It is noted that the second number of bits for a channel for a block is relevant for all of the data values relating to that channel for the block, rather than different data values relating to the channel within the block having different second numbers of bits determined for them.

Step S410 may comprise the difference value size determination logic 308 determining whether representing the difference values for the one or more channels with the respective determined one or more first number of bits would satisfy the target level of compression. If it is determined that representing the difference values for the one or more channels with the respective determined one or more first number of bits would satisfy the target level of compression then, for each of the one or more channels, the second number of bits equals the first number of bits for that channel. In other words, if lossless compression of the image element values in the block will satisfy the target level of compression then the image element values are compressed losslessly. However, if it is determined that representing the difference values for the one or more channels with the respective determined one or more first number of bits would not satisfy the target level of compression then, for at least one of the one or more channels, the second number of bits is less than the first number of bits for that channel. In other words, if lossless compression of the image element values in the block will not satisfy the target level of compression then the data values for at least one of the one or more channels are compressed in a lossy manner to ensure that the target level of compression is satisfied. For example, the amount of loss introduced into the data values of the image element values being compressed may be no more than is necessary in order to satisfy the target level of compression.

In examples described herein, the one or more second numbers of bits for the one or more channels are determined using said determined first numbers of bits for the one or more channels in accordance with a predetermined scheme. Determining the second numbers of bits from first numbers of bits in accordance with the predetermined scheme means that the second numbers of bits are determined in a deterministic manner. In these examples, the same predetermined scheme is used by the compression unit 302 and the decompression unit 602 (as described in more detail below with reference to FIGS. 6 and 7). Since the same predetermined scheme for determining the second numbers of bits using the first numbers of bits is used in both the compression unit 302 and the decompression unit 602, indications of the one or more second numbers of bits do not need to be included in the compressed data. As described below, indications of the one or more first numbers of bits are included in the compressed data, so the decompression unit 602 can use the one or more first numbers of bits and the predetermined scheme to determine the same one or more second numbers of bits as are determined in the compression unit 302. The predetermined scheme may be referred to as a predetermined technique or a predetermined algorithm.

In step S412 the difference value determination logic 306 determines, for each of the one or more channels, difference values representing differences between the data values and the determined origin value for the channel for the block. For example, if the origin value is the minimum of the data values for the channel in the block, then the difference values can be determined by subtracting the origin value from the data values for the channel in the block.

In the example shown in FIGS. 3 and 4, the difference values are determined after the first and second numbers of bits have been determined. In some other examples, the difference values may be determined before the first and second numbers of bits are determined. In particular, in these other examples, the determined difference values may be used in order to determine the first number of bits, e.g. by identifying the maximum difference value.

The compressed data formation logic 310 receives, for each of the one or more channels, the origin value, the first number of bits, the second number of bits and the difference values. In step S414 the compressed data formation logic 310 forms compressed data, e.g. as a compressed block of data, wherein the compressed data comprises, for each of the one or more channels:

an indication of the determined origin value for the channel;
  an indication of the determined first number of bits for the channel; and
  representations of the determined difference values for the channel, wherein each of the representations of the determined difference values for the channel uses the determined second number of bits for the channel, such that the target level of compression is satisfied.

The compressed data (e.g. the compressed block of data) is output from the compression unit 302, and may for example be passed to the memory 104 via the memory interface 108. The compressed data can then be stored in the memory 104. Alternatively, the compressed data may be stored in a memory other than the memory 104, e.g. the compressed data may be stored in a local memory on the GPU 102.

The target level of compression corresponds to a target compressed block size. For blocks of image data which have a fixed size then the target level of compression for compressing the blocks of image data means that the compressed blocks of data do not exceed the target compressed block size. If the compression of a block of image data "satisfies the target level of compression" this means that the resulting compressed block of data does not exceed the target compressed block size. The compressed block of data may be smaller than the target compressed block size, e.g. if lossless compression of a block of image data results in a compressed block which is smaller than the target compressed block size. In this sense the target compressed block size represents a maximum size for the compressed block. The compression unit 302 may have a set of fixed target levels of compression. For example, the set of target levels of compression may comprise:

(i) a lossless level of compression in which all of the image element values are losslessly compressed even if this does not result in any reduction in the size of the data (this can be considered to be equivalent to a target compression ratio of 1:1, which may be referred to in terms of the target compressed block size being 100% of the size of the uncompressed block of image data);
  (ii) a 75% level of compression in which the target compressed block size is 75% of the size of the uncompressed block of image data. This corresponds to a compression ratio of 4:3;
  (iii) a 50% level of compression in which the target compressed block size is 50% of the size of the uncompressed block of image data. This corresponds to a compression ratio of 2:1; and
  (iv) a 25% level of compression in which the target compressed block size is 25% of the size of the uncompressed block of image data. This corresponds to a compression ratio of 4:1.

In examples described herein, the target levels of compression refer to the amount of data used to store the difference values. The size of the data used to store the indications of the origin values and the indications of the first numbers of bits is fixed and does not depend on the target level of compression used by the compression unit 102, and is not included in determining the compression ratios "1:1", "4:3", "2:1" and "4:1" in the examples listed above.

If the compression unit is implemented in dedicated hardware (e.g. as fixed function circuitry) the compression unit 302 may be configured in hardware to be able to perform compression according to any of the target levels of compression in the set of target levels of compression. A selection can be made of one of the target levels of compression from the set of target levels of compression for use by the compression unit 302 when compressing a block of image data. For example, the target level of compression implemented by the compression unit 302 may be configured before runtime, e.g. by firmware instructions which are executed when the GPU is initialised. In this way, the compression unit 302 will compress all of the blocks of image data according to the same target level of compression unless the configuration of the compression unit 302 is subsequently altered. Alternatively, when a block of image data is provided to the compression unit 302 to be compressed, an indication can be provided with the block of image data to the compression unit 302 to indicate what the target level of compression is for compressing the block of image data. This would allow the compression unit 302 to compress different blocks of image data according to different target levels of compression without needing to be reconfigured, but it would add a little extra complexity into the system due to the indications of the target level of compression which would be sent with the blocks of image data to the compression unit 302. During decompression a driver for the GPU sends an indication of the target level of compression to the decompression unit. This can be relatively simple if the target level of compression does not change during runtime for different blocks of image data. However, if the target level of compression can change during runtime for different blocks of image data then the driver could keep track of the target levels of compression for the different compressed blocks of data and indicate these target levels of compression to the decompression unit so that the decompression unit can correctly decompress the compressed blocks of data in accordance with their target levels of compression. In some other examples, indications of the target levels of compression for the blocks could be included in the header portions of the compressed blocks of data, such that when decompressing a compressed block of data, the decompression unit can read the indication of the target level of compression from the header portion of the compressed block of data to thereby determine the target level of compression for the block, rather than the driver tracking the target levels of compression.

In different examples, in step S410, the one or more second numbers of bits can be determined differently based on the one or more first numbers of bits. For example, in order to determine the one or more second numbers of bits, the one or more first numbers of bits can be reduced by zero, one or more, such that representing each of the difference values for the one or more channels with said respective one or more second numbers of bits by removing zero, one or more least significant bits (LSBs) from representations of the difference values having the determined first numbers of bits satisfies the target level of compression for compressing the block of image data. The amounts by which the one or more first numbers of bits are reduced to thereby determine the one or more second numbers of bits can be defined by the predetermined scheme. If the first number of bits for a channel is reduced by zero this means that the second number of bits for the channel will be equal to the first number of bits for the channel. Similarly, if zero LSBs are removed from a representation of a difference value having a first number of bits, this will not change the representation of the difference value. The LSBs are removed (rather than removing other bits) from the representations of the difference values because these are the bits that are least significant in terms of representing the values of the difference values, such that removing the LSBs will lose less information than if other bits were removed from the difference values. In this way, although some loss of information is introduced into the compression process by removing LSBs from the difference values, the loss of information is small, and for example, is only to an extent for guaranteeing that the target level of compression is satisfied.

As mentioned above, the predetermined scheme for determining the one or more second numbers of bits from the one or more first numbers of bits can be different in different examples. Furthermore, in examples described herein, there is a threshold number of bits for each of the one or more channels, wherein if the second number of bits is equal to the threshold number of bits for each of the one or more channels then the target level of compression for compressing the block of image data will be satisfied. In these examples, if a first number of bits for a channel is less than or equal to the threshold number of bits for the channel, then the first number of bits for the channel is reduced by zero, such that the second number of bits for the channel equals the first number of bits for the channel; and if a first number of bits for a channel is greater than the threshold number of bits for the channel, then the amount by which the first number of bits is reduced does not result in the second number of bits for the channel being less than the threshold number of bits. Using the threshold number of bits for each of the one or more channels can prevent the number of bits used for the difference values of any one particular channel being reduced by too much. For example, if the difference values for a channel already have a small number of bits (e.g. 2 bits) then losing an LSB from those difference values is a relatively significant loss in information compared to losing an LSB from difference values of a different channel which have more bits (e.g. 6 bits). For example, if the target level of compression is 50% (i.e. if the size of the one or more difference values for an image element value cannot exceed 50% of the size of the one or more data values of the image element value) then the threshold number of bits for each channel could be set at half of the number of bits used for each of the data values, or could be set at one less than half of the number of bits used for each of the data values, to give just two examples. The threshold number of bits could be the same for each of the one or more channels. Alternatively, it might not be the case that the threshold number of bits is the same for each of the one or more channels. For example, if the image element values represent colour values with data values in Red, Green, Blue and Alpha channels, then a threshold number of bits used for the Alpha channel may be different to a threshold number of bits used for the Red, Green and Blue channels. In some examples, one or more selected channels may be prioritised over other channels, e.g. by setting the threshold number of bits for the one or more selected channels to a higher value than the threshold number of bits set for the other channels.

Apart from the use of the threshold number of bits for each of the one or more channels, the predetermined scheme may aim to reduce each of the one or more channels evenly, e.g. by the same or a similar amount. For example, according to the predetermined scheme, least significant bits may be dropped sequentially from the individual channels until the target level of compression is met. In other words, one bit is removed from each of the above-threshold channels in turn, until the total number of bits meets the target level of compression. The order in which LSBs are dropped from the different channels is defined by the predetermined scheme.

In examples described above, the analyser logic 304 obtains the maximum difference value for a channel for a block in step S406 by identifying the minimum and maximum data values relating to the channel for the block and subtracting the identified minimum data value from the identified maximum data value. However, in other examples, the maximum difference value for a channel for a block could be determined by determining all of the difference values for the channel for the block and then identifying the maximum of those determined difference values. In these other examples, analyser logic may obtain the maximum difference value for a channel for the block by receiving the determined difference values for the channel for the block, and determining which of the determined difference values is the largest.

It is noted that if all of the data values for a channel in a block have the same value then no difference values are stored for that channel in the compressed block of data. In this case the first number of bits for the channel and the second number of bits for the channel are both zero, and the origin value for the channel stored in the header indicates the single value that each of the data values have for the channel in the block.

As described above, in some examples, the origin value for a channel for the block is determined by identifying a minimum of the data values relating to the channel for the block, and the maximum difference value of the difference values for the channel for the block is determined by identifying a maximum of the data values relating to the channel for the block and subtracting the identified minimum of the data values relating to the channel for the block from the identified maximum of the data values relating to the channel for the block. In these examples, the difference values for a channel are determined by subtracting the origin value for the channel form the data values relating to the channel. In these examples, the origin value for a channel represents a floor (i.e. a minimum value) for the data values relating to the channel for the block, and the difference values for the channel represent additions to be made to the origin value for the channel when decompressing the compressed block of data.

However, in other examples, the origin value for the channel for the block is determined by identifying a maximum of the data values relating to the channel for the block, and the maximum difference value of the difference values for the channel for the block is determined by identifying a minimum of the data values relating to the channel for the block and subtracting the identified minimum of the data values relating to the channel for the block from the identified maximum of the data values relating to the channel for the block. In these examples, the difference values for a channel are determined by subtracting the data values relating to the channel from the origin value for the channel. In these examples, the origin value for a channel represents a ceiling (i.e. a maximum value) for the data values relating to the channel for the block, and the difference values for the channel represent subtractions to be made from the origin value for the channel when decompressing the compressed block of data.

In some examples, it may be possible to set the origin value for a channel within the range of data values for the channel for the block (e.g. at a value in the middle of the range of data values for the channel for the block, e.g. at a value half way between the maximum and the minimum data value relating to the channel for the block), wherein the difference values can be signed values.

In some examples, the origin value and the difference values for each of the one or more channels for the block may be determined in accordance with modular arithmetic. In these examples, the origin value for each of the one or more channels can be determined to be one of the data values of the block relating to the channel which results in the smallest maximum difference value when the difference values are determined relative to the origin value in accordance with the modulus of the modular arithmetic. For example, the difference values may be determined modulo $2^n$, where n is the number of bits in each of the data values. For example, if the data values are 8-bit values then the difference values may be determined modulo 256. For example, if the data values relating to a channel for the block are 8-bit values representing values of 251, 255, 7 and 16 in decimal (i.e. in binary the data values are 11111011, 11111111, 00000111 and 00010000), the origin value could be determined to be 251 (which can be considered to represent a value of −5 when the values are represented modulo-256). Taking 251 to be the origin value for these four data values, the difference values can be determined to be 0, 4, 12 and 21, such that the first number of bits determined for these difference values is five, i.e. the maximum difference value (21) can be represented losslessly with five bits (as 10101). It is noted that if modular arithmetic was not used to compress this block of four data values, then the difference values would each need to have eight bits, e.g. if the origin value was determined to be the minimum value in the block (i.e. 7), then the maximum difference value would be 248, which needs eight bits to be represented losslessly (as 11111000).

In the examples described above, a single origin value is determined for each of the one or more channels for the block. In some other examples, a plurality of origin values may be determined for at least one of the one or more channels. In these other examples, each of the difference values for the at least one of the one or more channels (for which there are multiple origin values) is determined with respect to one of the plurality of origin values, and an indication for each of the difference values is included in the compressed block to indicate which of the plurality of origin values the difference value has been determined from. This can be useful if the data values relating to a channel within the block form multiple groups of data values, with each group of data values having a small range. This situation can occur relatively frequently, e.g. if the image element values within the block of image data relate to multiple different objects in a scene. For example, if the data values relating to a channel for the block were 3, 5, 3, 4, 6, 132, 132, 133 then a first origin value could be determined as 3 and a second origin value could be determined as 132, and then the difference values for the first five data values can be determined with respect to the first origin value as 0, 2, 0, 1 and 3, and the difference values for the last three data values can be determined with respect to the second origin value as 0, 0 and 1. In this case, the first number of bits determined for these difference values is two, i.e. the maximum difference value (3) can be represented losslessly with two bits (as 11). It is noted that if a single origin value was used to compress this block of data values, then the difference values would each need to have eight bits, e.g. if the origin value was determined to be the minimum value (i.e. 3), then the maximum difference value would be 130, which needs eight bits to be represented losslessly (as 10000010).

As mentioned above, in examples described herein, the compressed data is stored as a compressed block of data, e.g. the headers and difference values may be stored in the same contiguous block of compressed data. However, more generally, it is to be understood that the compressed data does not need to be stored as a block, e.g. as a contiguous block, of data. For example, the headers and the difference values may be stored separately, e.g. in separate sections of memory.

Figure 5A:
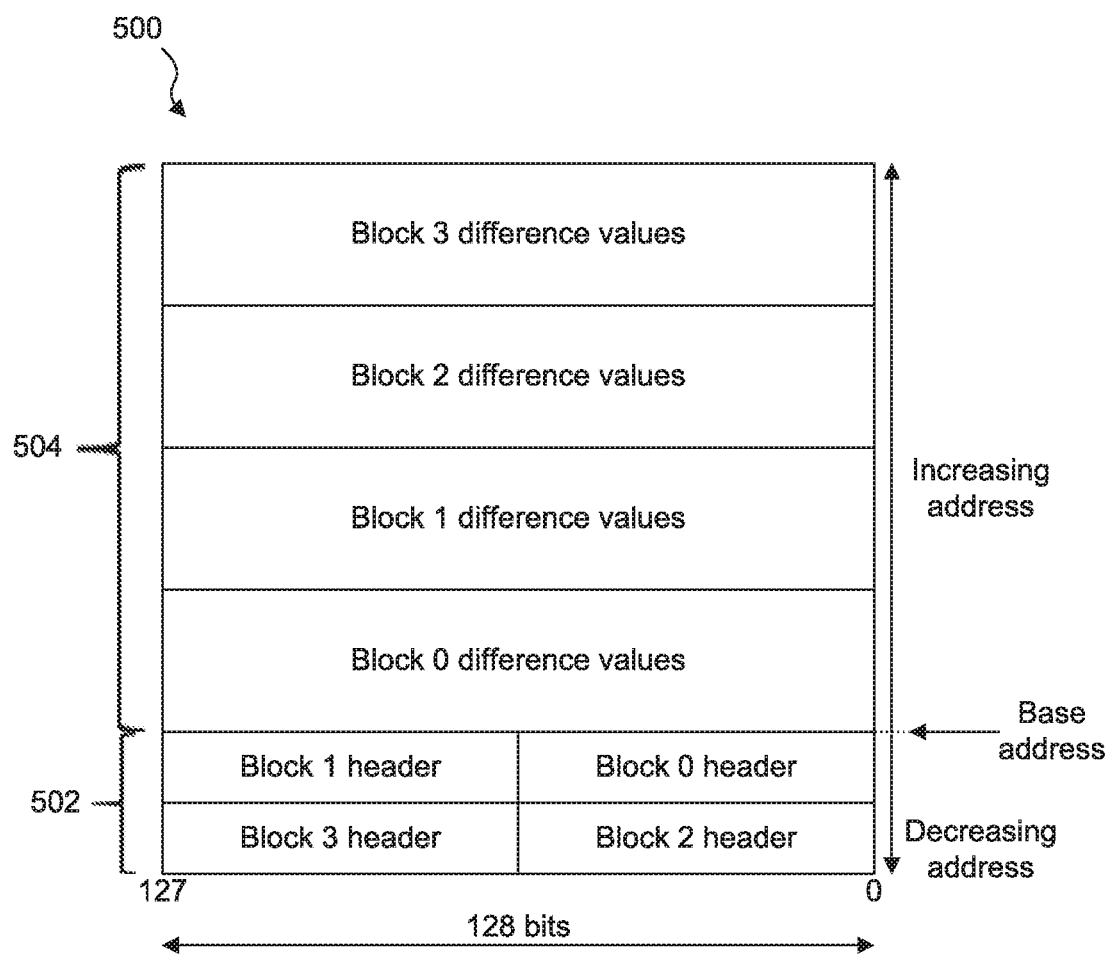
FIG. 5a illustrates an example format for storing four compressed blocks of data.
Figure 5B:
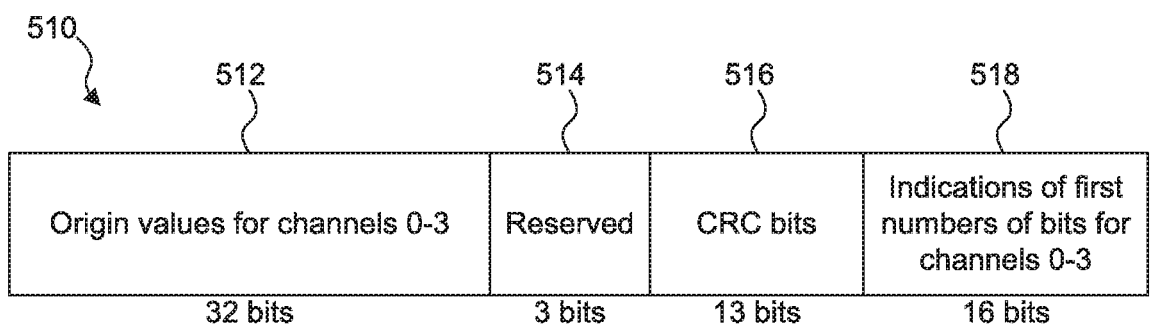
FIG. 5b illustrates an example format for the data within a header portion for a compressed block of data.

FIGS. 5a and 5b represent an example format for compressed blocks of data. In particular, FIG. 5a illustrates an example format 500 for storing four compressed blocks of data, denoted Block 0, Block 1, Block 2 and Block 3 in FIG. 5a. Each of the compressed blocks of data comprises a header portion (stored in section 502), which has a fixed size, and which comprises the indication of the determined origin value and the indication of the determined first number of bits for each of the one or more channels for the block. Each of the compressed blocks of data also comprises a body portion (stored in section 504), which has a variable size, and which comprises the representations of the determined difference values for each of the one or more channels. In the example shown in FIG. 5a, multiple (i.e. four) compressed blocks of data are stored together, such that the header portions of the compressed blocks are stored together in the section 502 and the body portions of the compressed blocks are stored together in the section 504. In other examples, each compressed block of data may be stored separately, i.e. in a distinct address space, such that the header portion and the body portion of each compressed block of data are stored in a contiguous range of addresses.

The four compressed blocks denoted in FIG. 5a may correspond with the respective four blocks of image data $202_0$, $202_1$, $202_2$ and $202_3$ shown in FIG. 2, such that each block of image data comprises sixteen image element values. In this example, each image element value comprises four 8-bit data values relating to Red, Green, Blue and Alpha channels respectively, such that each image element value is represented with 32 bits. Therefore, each uncompressed block of image data is represented with 512 bits. The target level of compression in this example is 50%. This means that, in this example, the maximum total number of bits that the difference values for each compressed block of data can be represented with is 256 (i.e. sixteen bits per image element value, to be divided between the four channels). In the example shown in FIG. 5a, each of the header portions for a compressed block of data comprises 64 bits. In the example shown in FIG. 5a, each line of the address space represents 128 bits, so header portions for two compressed blocks can be on the same line, and each of the body portions for the different compressed blocks of data is provided with a maximum memory footprint corresponding to two lines of the address space, i.e. 256 bits.

Because the compression technique described herein is guaranteed to satisfy the target level of compression (e.g. 50% compression target), the body portion of a compressed block of data will not exceed the 256 bits provided for it in the example shown in FIG. 5a. Each compressed block of data has a fixed storage allocation (i.e. a fixed memory footprint), which it will not exceed, and which is determined by the target level of compression.

As an example in which there are n channels (channel 0 to channel (n−1)), the difference values relating to m data values (data value 0 to data value (m−1)) are stored in the body portion of the compressed block of data in the order: data value 0, channel 0; data value 0, channel 1; . . . data value 0, channel (n−1); data value 1, channel 0; . . . data value 1, channel (n−1); . . . data value (m−1), channel 0; . . . data value (m−1), channel (n−1). In other words, the difference values relating to a particular data value are stored for each of the different channels, and then the difference values relating to the next data value are stored for each of the different channels, and so on. This allows the difference values relating to a particular data value for each of the different channels to be read from the compressed block of data in one chunk. This can be useful if some but not all of the data values in a compressed block of data are to be decompressed.

FIG. 5b illustrates an example format 510 for the data within a header portion for a compressed block of data. In this example, 64 bits of data is included in the header portion for a compressed block of data. In particular, the header portion comprises the indications of the origin values for the four channels 512. In this example, 32 bits are used for these indications of the origin values, such that 8 bits is used for each of the indications of an origin value for a channel. In this way, for each of the one or more channels, the indication of the origin value for the channel has the same number of bits as one of the data values relating to the channel of one of the image element values in the block of image data. In this way, the precision of the origin value is not reduced, so no data is lost in the origin value, even when lossy compression is being implemented. The header portion also comprises three reserved bits 514, which can be used for different purposes in different examples. The reserved bits allow some flexibility in the data that is stored in the compressed blocks in different examples. The header portion also comprises some error correction indications 516, e.g. Cyclic Redundancy Check (CRC) bits, which are described below. In the example shown in FIG. 5b, 13 bits are used for the error correction indications. The header portion also comprises an indication of the first number of bits for each of the channels 518. In this example, there are four channels, and each indication of the first number of bits has four bits such that there are sixteen bits used for the indications of the first numbers of bits. The use of four bits for an indication of a first number of bits, allows values from 0 to 15 to be represented by each of the first numbers of bits.

In examples described herein, the compressed block of data has a base address, and the header portion starts at a first address defined by the base address, with the data of the header portion running in a first direction from the first address, and wherein the body portion starts at a second address defined by the base address, with the data of the body portion running in a second direction from the second address, wherein the first direction is opposite to the second direction in address space. For example, if each compressed block of data was stored separately then the base address could point to the start of the body portion of the compressed block of data and the addresses of the body portion increase from that point, and the header portion can start from the base address minus 1 and the addresses of the header portion decrease from that point. The example shown in FIG. 5a is slightly more complicated because four compressed blocks of data are being stored together. However, even in this case, the starting addresses of the header portions for each of the different compressed blocks of data are defined by the base address, and the starting addresses of the body portions for each of the different compressed blocks of data are defined by the base address.

In the examples described above, the compressed block of data does not include an indication of the determined second number of bits for each of the one or more channels. Instead, an indication of the first number of bits for each of the one or more channels is included in the compressed block of data and the same predetermined scheme that was used to determine the second numbers of bits from the first numbers of bits can be used in the decompression unit 112 to determine the second numbers of bits as described in more detail below.

However, in other examples, the compressed block of data may further comprise (e.g. in the header portion of the compressed block of data), for each of the one or more channels, an indication of said determined second number of bits for the channel. For example, the header portion of the compressed block of data might not include the reserved bits 514 or the error correction indications 516, in which case those bits (e.g. sixteen bits) could be used to store indications of the second numbers of bits for the respective channels.

In some examples, where there are a plurality of channels, the compression unit 302 may perform decorrelation (e.g. colour decorrelation) on the plurality of channels to thereby reduce or remove correlation between the different data values relating to the different channels of an image element value. For example, between steps S402 and S404 in the method shown in the flow chart of FIG. 4, the compression unit 302 may perform colour decorrelation.

Methods of performing colour decorrelation are known in the art, but as a simple example, a colour decorrelation technique can be used when the image data is in an RGB format such that each image element value comprises a red data value (R), a green data value (G) and a blue data value (B). The colour decorrelation process can comprise:
 calculating the data values for the red channel (R') in accordance with the equation R'=R−G;
 determining the data values for the green channel (G') in accordance with the equation G'=G; and
 calculating the data values for the blue channel (B') in accordance with the equation B'=B−G.

The values of R', G' and B' can then be used in the rest of the compression process, e.g. from step S404 onwards shown in the flow chart of FIG. 4.

As mentioned above, in some examples, one or more error correction indications may be included in the compressed block of data. These error correction indications can be determined by the compression unit 302 by determining image element values that would be obtained by correctly decompressing the compressed block of data. The error correction indications can be CRC bits which can be calculated in a known manner. If the difference values are being losslessly represented in the compressed block of data, e.g. if the first number of bits equals the second number of bits for each of the one or more channels, then the CRC bits can be calculated from the original data values of the block of image data, since these are the values that should be obtained by correctly decompressing the compressed block of data. However, if any of the difference values are being represented lossily in the compressed block of data, e.g. if the first number of bits does not equal the second number of bits for any of the one or more channels, then the compression unit 302 can determine the data values that the decompression unit 602 should obtain by correctly decompressing the compressed block of data, and then the CRC bits can be calculated from the data values determined by the compression unit 302. The compression unit may, for example, determine the data values that the decompression unit should obtain by analysis of the block of input data and the various determinations made during the compression process. Alternatively, the compression unit may decompress the compressed block of data to determine the data values that the decompression unit should obtain. In this way, error correction techniques can be used even when lossy compression is being performed to determine whether there are any errors in the transmission of the data representing the compressed block of data, e.g. in the transmission from the compression unit 110 to the memory 104 via the memory interface 108, and back from the memory 104 to the decompression unit 112 via the memory interface 108.

Example Compression

There is now described an example in which each image element value has data values relating to four colour channels: a Red channel (R), a Green channel (G), a Blue channel (B) and an Alpha channel (A). In this example, a block of four pixel values is to be compressed. Each pixel value is represented with 32 bits in a R8G8B8A8 format (i.e. each data value is represented with 8 bits), so the uncompressed block of image data is represented with 128 bits. The target level of compression is 50%, so the body portion of the compressed block of data cannot exceed 64 bits. The Red, Green, Blue and Alpha values in the block can be represented as separate data sets. In this example, the values of the four pixels in the block in the different channels are:
R=[16, 24, 9, 45]
G=[89, 89, 94, 84]
B=[240, 215, 204, 228]
A=[255, 255, 250, 255]

In this example, the origin values are determined as the minimum values in the block for each channel. Therefore, the origin values and difference values are:
R: origin=9, difference values=[7, 15, 0, 36]. The lossless difference values for the Red channel can be represented in binary with 6 bits (i.e. the first number of bits for the Red channel is 6), i.e. they can be represented as: [000111, 001111, 000000, 100100].
G: origin=84, delta values=[5, 5, 10, 0]. The lossless difference values for the Green channel can be represented in binary with 4 bits (i.e. the first number of bits for the Green channel is 4), i.e. they can be represented as:: [0101, 0101, 1010, 0000].
B: origin=204, delta values=[36, 11, 0, 24]. The lossless difference values for the Blue channel can be represented in binary with 6 bits (i.e. the first number of bits for the Blue channel is 6), i.e. they can be represented as:: [100100, 001011, 000000, 011000].
A: origin=250, delta values=[5, 5, 0, 5]. The lossless difference values for the Alpha channel can be represented in binary with 3 bits (i.e. the first number of bits for the Alpha channel is 3), i.e. they can be represented as: [101, 101, 000, 101].

The 50% compression target allows 16 bits per pixel value for the difference values, but if all of the channels were compressed losslessly in this example, there would be 19 bits per pixel value for the difference values (i.e. 6+4+6+3=19). In this example, the per-channel threshold for each difference value size is 4 bits, so we don't reduce the number of bits for the difference values of the Green or Alpha channels in the example above. According to the predetermined scheme, the second numbers of bits are determined for the channels to be R=4 bits, G=4 bits, B=5 bits, and A=3 bits. The indication of the origin value for each channel comprises 8 bits, and the indication of the first number of bits for each channel comprises 4 bits.

Therefore, in the compressed block we store the indications of the origin values, the indications of the first numbers of bits and difference values for the different channels, in binary, as:
R: origin value=00001001, first number of bits=0110, difference values: [0001, 0011, 0000, 1001]
G: origin value=01010100, first number of bits=0100, difference values: [0101, 0101, 1010, 0000]
B: origin value=11001100, first number of bits=0110, difference values: [10010, 00101, 00000, 01100] A: origin value=11111010, first number of bits=0011, difference values: [101, 101, 000, 101]

Decompression

As an overview of the decompression technique described herein, decompression can be performed on compressed data (e.g. a compressed block of data) to determine one or more image element values of the block of image data that the compressed data represents. As described above, the block of image data comprises a plurality of image element values, each image element value comprising one or more data values relating to a respective one or more channels. The compressed data comprises, for each of the one or more channels, an indication of an origin value, an indication of a first number of bits for losslessly representing the difference values, and representations of the difference values. A second number of bits is obtained for each of the one or more channels, wherein the second number of bits is the number of bits with which the representations of the difference values are included in the compressed data. If the second number of bits is less than the first number of bits for a channel then one or more LSBs are added (i.e. appended) to the difference values from the compressed data to determine the difference values having the first number of bits. Then, for each channel, the data values relating to that channel can be determined by combining the origin value for that channel and the difference values for that channel which have the first number of bits for that channel.

The compressed data may be stored as a compressed block of data having the format described above, e.g. as shown in FIGS. 5*a* and 5*b*. As mentioned above, in examples described herein, the compressed data is stored as a compressed block of data, e.g. the headers and difference values may be stored in the same contiguous block of compressed data. However, more generally, it is to be understood that the compressed data does not need to be stored as a block, e.g. as a contiguous block, of data. For example, the headers and the difference values may be stored separately, e.g. in separate sections of memory. In the example format of the compressed block of data shown in FIGS. 5*a* and 5*b*, the header portion of the compressed block of data has a fixed size. Furthermore, the second numbers of bits can be determined based on information in the header portion without needing to read any data from the body portion of the compressed block of data. When the second numbers of bits have been determined then the position of each of the difference values can be determined. For example, the sum of second numbers of bits for the one or more channels gives an overall compressed size of the difference values relating to the data values of one image element value, which can be used to determine the offset to the required difference values for the image element values being decompressed. Therefore, the difference values for some of the data values can be read without necessarily reading all of the difference values. This means that the decompression unit 112 can determine decompressed values for one or more of the image element values in the block of image data without necessarily decompressing the entire compressed block of data. For example, the block of image data may comprise sixteen texel values, and a bilinear texture filtering operation might need to determine just four of the texel values from the compressed block of data. With the decompression technique described in examples herein, the decompression unit 112 can determine the four desired texel values without decompressing the other 12 texel values in the compressed block of data. In this way, the compressed block of data is "randomly accessible". Furthermore, it is even possible to decompress individual data values relating to individual channels from the compressed block of data without necessarily decompressing other data values from the compressed block of data (even data values relating to different channels for the same image element value).

Figure 6:
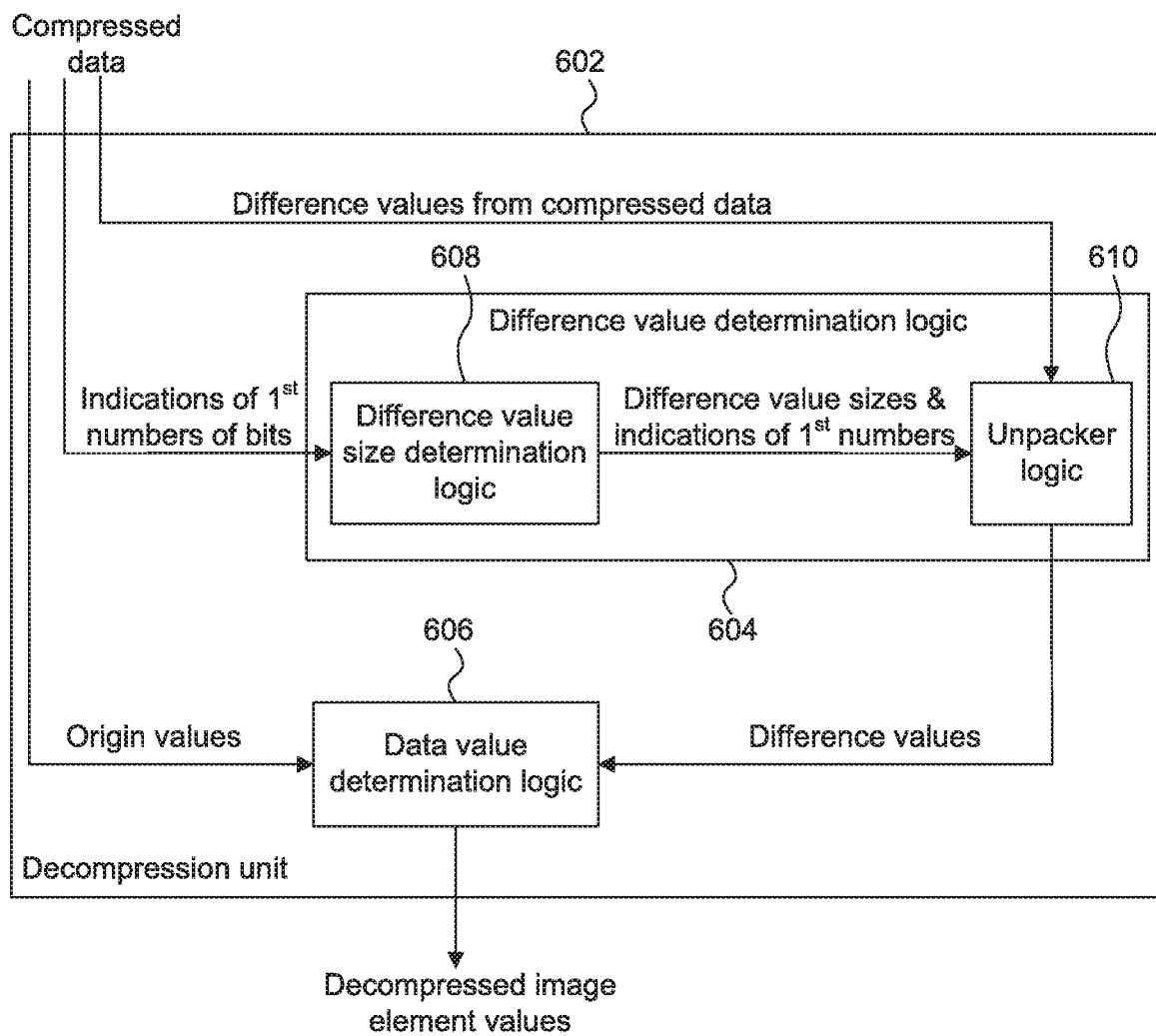
FIG. 6 shows a decompression unit.

An example of a decompression technique is now described with reference to FIGS. 6 and 7. FIG. 6 shows a decompression unit 602 configured to perform decompression to determine one or more image elements values from compressed data (e.g. a compressed block of data). The decompression unit 602 may be implemented as the decompression unit 112 in the graphics processing system shown in FIG. 1. The decompression unit 602 comprises difference value determination logic 604 and data value determination logic 606. The difference value determination logic 604 comprises difference value size determination logic 608 and unpacker logic 610. Each of the logic blocks 604 to 610 implemented in the decompression unit 602 may be implemented in hardware (e.g. dedicated hardware implemented with fixed-function circuitry), software (e.g. as a software module executing on a processor), or a combination thereof. Implementing the logic blocks in hardware would normally provide a lower latency of operation than implementing the logic blocks in software. However, implementing the logic blocks in software allows more flexibility in terms of altering the functionality of the logic blocks after manufacture of the decompression unit 602. So in some systems, a hardware implementation may be more suitable than a software implementation (e.g. when the compression needs to be performed quickly), whereas in some other systems, a software implementation may be more suitable than a hardware implementation (e.g. when the functionality of the decompression unit needs to be variable).

Figure 7:
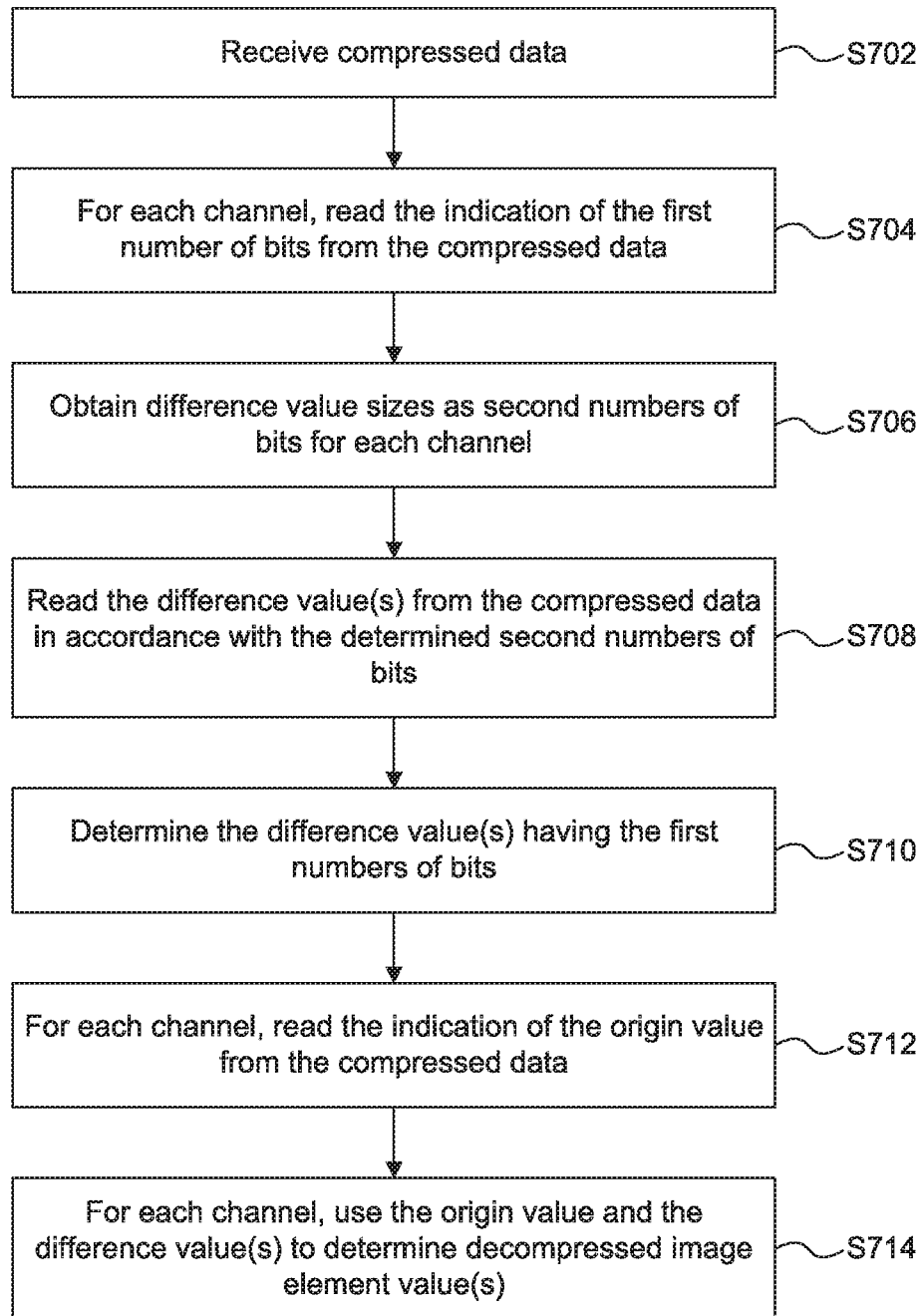
FIG. 7 is a flow chart for a method of performing decompression to determine one or more image element values from compressed data.

FIG. 7 shows a flow chart for a method of performing decompression to determine one or more image element values from a compressed block of data which has been compressed as described above to satisfy a target level of compression. In this example, the compressed data is in a compressed block of data, but in other examples, the compressed data is not necessarily in a block of compressed data.

In step S702 the compressed block of data is received at the decompression unit 602. For example, if the decompression unit 602 is being implemented as the decompression unit 112 in the graphics processing system shown in FIG. 1, the compressed block of data may be received from the memory 104 via the memory interface 108.

In step S704 the difference value size determination logic 608 reads the indication of the first number of bits from the compressed block of data for each of the one or more channels. As described above, the first number of bits for a channel is a number of bits which can be used to losslessly represent the difference values for the channel for the block.

In step S706 the difference value size determination logic 608 obtains the difference value sizes of the difference values stored in the compressed block for each of the one or more channels. In other words, in step S706 the difference value size determination logic 608 obtains (e.g. determines) a second number of bits for each of the one or more channels, wherein representations of the difference values for each of the one or more channels are included in the compressed block of data using the second number of bits for that channel. As described above, the one or more second numbers of bits are determined to ensure that the compressed block of data satisfies a target level of compression for compressing the block of image data. The determined difference value sizes (i.e. the second numbers of bits) and the indications of the first numbers of bits for the one or more channels are provided to the unpacker logic 610.

In examples described herein in which indications of the second numbers of bits are not included in the compressed block of data, step S706 involves using the first number of bits for each of the one or more channels to determine the second number of bits for the channel in accordance with a predetermined scheme. In particular, the predetermined scheme is the same scheme as that used in the compression unit 302 described above, such that given the same set of one or more first numbers of bits, the decompression unit 602 will determine the same set of one or more second numbers of bits as were determined in the compression unit 302. In other words, a common function is used by both the compression unit 302 and the decompression unit 602 that determines how many LSBs are dropped from the difference values for each of the one or more channels.

In particular, similarly to as described above in relation to the compression process, step S706 may involve determining whether representing the difference values for the one or more channels with the respective determined one or more first number of bits would satisfy the target level of compression. If it is determined that representing the difference values for the one or more channels with the respective determined one or more first number of bits would satisfy the target level of compression then, for each of the one or more channels, the second number of bits equals the first number of bits for that channel. However, if it is determined that representing the difference values for the one or more channels with the respective determined one or more first number of bits would not satisfy the target level of compression then, for at least one of the one or more channels, the second number of bits is less than the first number of bits for that channel.

Furthermore, as described above in relation to the decompression process, in some examples there is a threshold number of bits for each of the one or more channels. If a first number of bits for a channel is less than or equal to the threshold number of bits for the channel, then the second number of bits for the channel equals the first number of bits for the channel. If a first number of bits for a channel is greater than the threshold number of bits for the channel, then the second number of bits for the channel is within a range from the threshold number of bits for the channel to the first number of bits for the channel. As described above, in some examples, the threshold number of bits is the same for each of the one or more channels; whereas in some other examples, it is not the case that the threshold number of bits is the same for each of the one or more channels.

Furthermore, as described above, in some examples an indication of the second number of bits for each of the one or more channels may be included in the compressed block of data. In these examples, the difference value size determination logic 608 does not need to be implemented in the decompression unit. In these examples, a second number of bits is obtained by the difference value determination logic 604, for each of the one or more channels, by reading an indication of the second number of bits for the channel from the compressed block of data.

In step S708 the unpacker logic 610 uses the one or more second numbers of bits for the respective one or more channels to read the representations of the difference values for the one or more image element values being decompressed from the compressed block of data.

In step S710, based on the representations of the difference values read from the compressed block of data, the unpacker logic 610 determines, for each of the one or more channels and for each of the one or more image element values being decompressed, a difference value in accordance with said first number of bits for the channel. For example, the determined difference values for a channel have the first number of bits indicated for that channel. The determined difference values with the appropriate first number of bits for the respective channel are provided to the data value determination logic 606.

In examples described herein, in step S710 determining, for each of the one or more channels and for each of the one or more image element values being decompressed, a difference value in accordance with said first number of bits for the channel comprises adding (i.e. appending) zero, one or more least significant bits (LSBs) to the representations of the difference values read from the compressed block of data to thereby determine the difference values having said first number of bits for each of the one or more channels. If the first number of bits is the same as the second number of bits for a channel then zero LSBs are added to the representations of the difference values read from the compressed block of data. If the first number of bits is greater than the second number of bits for a channel then one or more LSBs are added to the representations of the difference values read from the compressed block of data to determine difference values having the first number of bits for the channel.

The values of the bits that are added can be different in different examples. In a simple example, the zero, one or more LSBs which are added to the representations of the difference values read from the compressed block of data are all zeros. Using zeros for the LSBs that are added means that when adding the difference values to the origin values, the results are guaranteed not to overflow, such that a simpler (e.g. smaller in terms of silicon area) adder can be used for adding the difference values to the origin values, than if other values are used for the LSBs that are added back on. Furthermore, using zeros for the LSBs that are added means that a data value of zero that is compressed and then decompressed and will still be zero. This can be useful, e.g. for representing red, blue and green channel values such that a completely black region (e.g. which has red, green and blue values of zero) will remain completely black after compression and decompression of the image element value. This can also be useful for representing alpha channel values such that a completely transparent image element value (i.e. an image element value with an alpha value of zero) will remain completely transparent after compression and decompression of the image element value.

In another example, the zero, one or more LSBs which are added to the representations of the difference values read from the compressed block of data are all ones. Using ones for the LSBs that are added means that a maximum data value (e.g. a value of 255 for an 8-bit data value) that is compressed and then decompressed and will still be the maximum data value. This can be useful, e.g. for representing red, blue and green channel values such that a completely white region (e.g. which has maximum red, green and blue values (e.g. values of 255 for 8-bit values)) will remain completely white after compression and decompression of the image element value. This can also be useful for representing alpha channel values such that a completely opaque image element value (i.e. an image element value with a maximum alpha value (e.g. an alpha value of 255 for an 8-bit value)) will remain completely opaque after compression and decompression of the image element value. If ones are used for the LSBs that are added to the difference values, then precautions may be taken to ensure that the sums of the difference values and the origin values do not overflow. For example, the corresponding LSBs of the origin value could be masked off when summing the difference values and the origin value.

In a further example, the zero, one or more LSBs which are added to the representations of the difference values read from the compressed block of data are random or pseudo-random bits. Using random or pseudo-random bits for the LSBs that are added may help to reduce visually perceptible banding effects being introduced into the image element values by the compression and decompression of the image element values.

In a yet further example, the zero, one or more LSBs which are added to the representations of the difference values read from the compressed block of data are different for different ranges of origin values or for different ranges of difference values. For example, for low origin values, e.g. for origin values below a threshold value, the zero, one or more LSBs which are added to the representations of the difference values are zeroes; whereas for high origin values, e.g. for origin values above the threshold value, the zero, one or more LSBs which are added to the representations of the difference values are ones. The threshold value could be any suitable value, e.g. anywhere between 1 and $(2^n-1)$. This may help to preserve a true black colour (represented with zeroes) and to preserve a true white colour (represented with ones). As another example, for difference values whose MSB is a zero, the zero, one or more LSBs which are added to the representations of the difference values are zeroes; whereas for difference values whose MSB is a one, the zero, one or more LSBs which are added to the representations of the difference values are ones.

In a different example, the zero, one or more LSBs which are added to the representations of the difference values for a channel read from the compressed block of data are equal to a corresponding zero, one or more most significant bits of the origin value for the channel. This can be useful so that for a block of generally high values (for which the MSBs of the origin value are ones), ones are added as the LSBs to the representations of the difference values, and for a block of generally low values (for which the MSBs of the origin value are zeros), zeros are added as the LSBs to the representations of the difference values. This compression/decompression technique tends to both: (i) compress a value of zero in a manner such that it is decompressed to give zero, and (ii) compress a maximum value in a manner such that it is decompressed to give the maximum value. Similarly to as described above, if the LSBs that are added to the representations of the difference values include one or more ones, then precautions may be taken to ensure that the sums of the difference values and the origin values do not overflow. For example, the corresponding LSBs of the origin value could be masked off when summing the difference values and the origin value.

The method may comprise performing a left shift operation on the bits of the representations of the difference values read from the compressed block of data by zero, one or more bit positions, and then adding the zero, one or more LSBs in the LSB position(s) after the shift, wherein the zero, one or more LSBs are determined as described above to thereby determine the difference values having said first number of bits for each of the one or more channels.

In step S712 the data value determination logic 606 reads, from the compressed block of data, the indication of the origin value for each of the one or more channels.

In step S714 the data value determination logic 606 determines, for each of the one or more channels, the data value relating to the channel for each of the one or more image element values being decompressed using: (i) the origin value for the channel, and (ii) the determined difference value for the channel for the image element value. The way in which the data values are determined using the difference values and the origin value for a channel matches the way in which the difference values and origin values were determined in the compression unit 302 based on the data values. As described above, the compression unit 302 may determine the origin values and difference values using the data values differently in different examples. For example, if the origin values are the minimum data values within the block, then for each of the one or more channels, the data value relating to the channel for each of the one or more image element values being decompressed is determined by summing the origin value for the channel and the determined difference value for the channel for the image element value. As another example, if the origin values are the maximum data values within the block, then for each of the one or more channels, the data value relating to the channel for each of the one or more image element values being decompressed is determined by subtracting the determined difference value for the channel for the image element value from the origin value for the channel. In the two examples given in this paragraph above, precautions may be taken to ensure that there is not a carry from the LSBs that have been added to the difference values into the more significant bits of the decompressed data values. For example, if the origin value and the difference values are added together, then a corresponding zero, one or more LSBs of the origin value (corresponding to the zero, one or more LSBs that are added to the difference values) are filled with zeros before adding the difference values. As another example, if the difference values are subtracted from the origin value, then a corresponding zero, one or more LSBs of the origin value (corresponding to the zero, one or more LSBs that are added to the difference values) are filled with ones before subtracting the difference values. For example, with 8-bit data values, this means that there is not an overflow from 00000000 to 11111111 or vice versa.

In a further example, for each of the one or more channels, the data value relating to the channel for each of the one or more image element values being decompressed may be determined by combining the origin value for the channel and the determined difference value for the channel for the image element value using addition or subtraction in modular arithmetic. In this example, precautions may be taken to ensure that the decompressed value lies on the correct side of the modulus of the modular arithmetic. For example, if a block of four 8-bit data values for a channel are 251, 255, 0 and 1, then according to the example which uses modular arithmetic, the origin value can be set as 251 (i.e. 11111011 in binary), and the difference values can be 0, 4, 5 and 6. These difference values can be represented losslessly with three bits, as 000, 100, 101 and 110, so the first number of bits is three. In this example, the second number of bits for the channel for the block is determined to be two in order to satisfy the target level of compression. Naïvely, the difference values could be stored as 00, 10, 10 and 11, but that could result in the decompressed data values being 251, 255, 255 and 1 (if the LSBs added in the decompression unit are zeros). The loss of data in the third data value has changed it from a value of 0 to a value of 255, which could be very noticeable. Therefore, when the difference values are compressed, the compression unit can identify whether the rounding in a difference value will cause the resulting decompressed data value to cross over the modulus of the modular arithmetic, and if so then the rounding for that difference value can be modified to avoid crossing over the modulus of the modular arithmetic. It is noted that the compression unit is aware of how the compressed data will be decompressed, so it can determine whether the rounding in the difference value will cause the resulting decompressed data value to cross over the modulus of the modular arithmetic. For example, the third difference value in the example above can be rounded up rather than down (but the other three difference values will still be rounded down), so that the three difference values can be stored as 00, 10, 11 and 11 in the compressed data. This would result in the decompressed values being 251, 255, 1 and 1. The loss of data in the third data value has changed it from a value of 0 to a value of 1, which would be much less noticeable than changing it from 0 to 255.

In yet another example, the compressed block of data comprises a plurality of origin values for at least one of the one or more channels, wherein an indication is included in the compressed block of data to indicate which of the plurality of origin values each of the difference values for said at least one of the one or more channels has been determined from. In this example, for said at least one of the one or more channels, the data value relating to the channel for each of the one or more image element values being decompressed is determined using: (i) the origin value for the channel indicated by the indication for the determined difference value for the channel for the image element value, and (ii) the determined difference value for the channel for the image element value.

The determined data values represent the decompressed image element values. The method may further comprise outputting the determined data values of the one or more image element values being decompressed for further processing. For example, where the decompression unit 602 is implemented as the decompression unit 112 in the graphics processing system 100, then the determined data values may be output from the decompression unit 112 to the processing logic 106 of the GPU 102, e.g. to be processed by the processing logic 106.

As described above, in some examples, where there are a plurality of channels, the compression unit 302 may perform decorrelation (e.g. colour decorrelation) on the plurality of channels to thereby reduce or remove correlation between the different data values relating to the different channels of an image element value before compressing the image element values. If this decorrelation was performed in the compression unit 302, then the decompression unit 602 performs a corresponding recorrelation process in order to determine image element values corresponding to the original image element values provided to the compression unit 302. In particular, after step S714 the decompression unit 602 may perform recorrelation (e.g. colour recorrelation) on the determined data values relating to the plurality of channels for each of the one or more image element values being decompressed to thereby introduce correlation between the different data values relating to the different channels of an image element value. For example, there may be three colour channels (Red, Green and Blue) and the colour recorrelation process may comprise:

calculating the red values (R) using the data values for the red channel (R') which have been determined in step S714 and using the data values for the green channel (G') which have been determined in step S714 in accordance with the equation R=R'+G';

determining the green values (G) using the data values for the green channel (G') which have been determined in step S714 in accordance with the equation G=G'; and calculating the blue values (B) using the data values for the blue channel (B') which have been determined in step S714 and using the data values for the green channel (G') which have been determined in step S714 in accordance with the equation B=B'+G'.

As mentioned above, in some examples, one or more error correction indications may be included in the compressed block of data. The decompression unit 602 can determine one or more error correction indications based on the determined data values of the one or more image element values being decompressed (i.e. based on the data values determined in step S714). The error correction indications can be CRC bits which can be calculated in a known manner. The decompression unit 602 can read the one or more error correction indications from the compressed block of data. Then the decompression unit 602 can compare the determined one or more error correction indications with the one or more error correction indications read from the compressed block of data to determine whether there are errors in the determined data values of the one or more image element values being decompressed. If it is determined that there are no errors in the decompressed image element values then the image element values can be trusted and used with confidence. This is particularly useful in a system implementing functional safety. For example, the graphics processing system 102 may be configured to operate in accordance with a safety standard, such as the ISO 26262 standard if the graphics processing system 102 is being implemented in an automobile for rendering images which are considered to be safety critical (e.g. for rendering images including warning symbols to be displayed on a dashboard of a car). If the decompression unit 602 determines that there is an error in the determined data values then this means that an error has occurred in the transmission of the data between the compression unit 302 and the decompression unit 602 (e.g. when the compressed data has been transferred to or from a memory). In this case the decompression unit 602 can output an error signal to indicate that an error has occurred. The rest of the system may react to this error signal in any suitable manner, e.g. by discarding the decompressed block of image data and/or requesting that the block of image data is compressed and transmitted again.

Example Decompression

In the example of compressing a block of image data given above, the values of the four pixels in the block in the different channels are:
R=[16, 24, 9, 45]
G=[89, 89, 94, 84]
B=[240, 215, 204, 228]
A=[255, 255, 250, 255]

and the resulting compressed block of data has the following data for the four channels:
R: origin value=00001001, first number of bits=0110, difference values: [0001, 0011, 0000, 1001]
G: origin value=01010100, first number of bits=0100, difference values: [0101, 0101, 1010, 0000]
B: origin value=11001100, first number of bits=0110, difference values: [10010, 00101, 00000, 01100]
A: origin value=11111010, first number of bits=0011, difference values: [101, 101, 000, 101]

We now describe how all of the image element values of this compressed block of data can be decompressed by the decompression unit 602. In step S704, the first numbers of bits are read from the compressed block of data, and these first numbers of bits are 6, 4, 6 and 3 for the respective Red, Green, Blue and Alpha channels. In step S706, the decompression unit 602 will determine that if lossless compression were used then there would be 19 bits per image element value for the difference values, whereas the target level of compression (50%) only allows a maximum of 16 bits per image element value for the difference values in this example. The same algorithm is used as in the compression technique described above, so the difference value size determination logic 608 determines that the difference value sizes (i.e. the second numbers of bits) for the channels are R=4 bits, G=4 bits, B=5 bits and A=3 bits.

In step S708, the unpacker logic 610 reads the difference values from the compressed block of data in accordance with the determined second numbers of bits. In step S710, the unpacker logic 610 adds LSBs to the difference values where appropriate to form difference values having the first numbers of bits for each of the channels. In this example, the bits that are added are all zeros, so the difference values will be determined to be (where the bits in bold have been added by the unpacker logic to the difference values in the compressed block):
Red delta values: [000100, 001100, 000000, 100100] (in decimal: [4, 12, 0, 36])
Green delta values: [0101, 0101, 1010, 0000] (in decimal: [5, 5, 10, 0])
Blue delta values: [100100, 001010, 000000, 011000] (in decimal: [36, 10, 0, 24])
Alpha delta values: [101, 101, 000, 101] (in decimal: [5, 5, 0, 5])

In step S712 the data value determination logic 606 reads the origin values from the compressed block of data. In step S714 the data value determination logic 606 adds the difference values to the origin values to determine the data values of the decompressed image element values as:
Red values determined as (in binary): 00001001+[000100, 001100, 000000, 100100]=[00001101, 00010101, 00001001, 00101101] (or in decimal: 9+[4, 12, 0, 36]=[13, 21, 9, 45])
Green values determined as (in binary): 01010100+[0101, 0101, 1010, 0000]=[01011001, 01011001, 01011110, 01010100] (or in decimal: 84+[5, 5, 10, 0]=[89, 89, 94, 84])
Blue values determined as (in binary): 11001100+[100100, 001010, 000000, 011000]=[11110000, 11010110, 11001100, 11100100] (or in decimal: 204+[36, 10, 0, 24]=[240, 214, 204, 228])
Alpha values determined as (in binary): 11111010+[101, 101, 000, 101]=[11111111, 11111111, 11111010, 11111111] (or in decimal: 250+[5, 5, 0, 5]=[255, 255, 250, 255])

By comparing these decompressed values with the original input values, it can be seen that in this example, some small errors have been introduced into the Red and Blue channels but not into the Green and Alpha channels.

As described above, some of the examples are described in detail herein with reference to a block of pixel data comprising pixel values, but more generally the compression and decompression processes can be performed in respect of a block of image data comprising image element values, wherein image element values may be pixel values, texel values, depth values, surface normal values or lighting values to give some examples.

All of the operations performed by the compression unit 302 and the decompression unit 602 described above are simple to implement in hardware, e.g. with shifters, adders and comparators. The compression unit 302 and the decompression unit 602 do not perform complex operations such as division. Furthermore, no big caches or other types of large local memory are needed for the operation of the compression unit 302 and the decompression unit 602. For these reasons, the compression unit 302 and the decompression unit 602 are simple to implement in hardware, which may result in smaller hardware (e.g. smaller silicon area), lower power consumption and/or lower latency of operation compared to more complex compression and decompression units. Furthermore, the same compression unit (e.g. compression unit 302) can perform lossless and lossy compression, so there is no need for two separate compression units if both lossless and lossy compression are desired to be implemented. Similarly, the same decompression unit (e.g. decompression unit 602) can perform lossless and lossy decompression on compressed blocks of data, so there is no need for two separate decompression units if both lossless and lossy decompression are desired to be implemented. Having a single compression unit and a single decompression unit configured to operate in both lossless and lossy manner reduces the amount of silicon area implemented in the compression and decompression units when both lossless and lossy techniques are desired (compared to implementing a lossless compression unit, a separate lossy compression unit, a lossless decompression unit and a separate lossy decompression unit).

Figure 8:
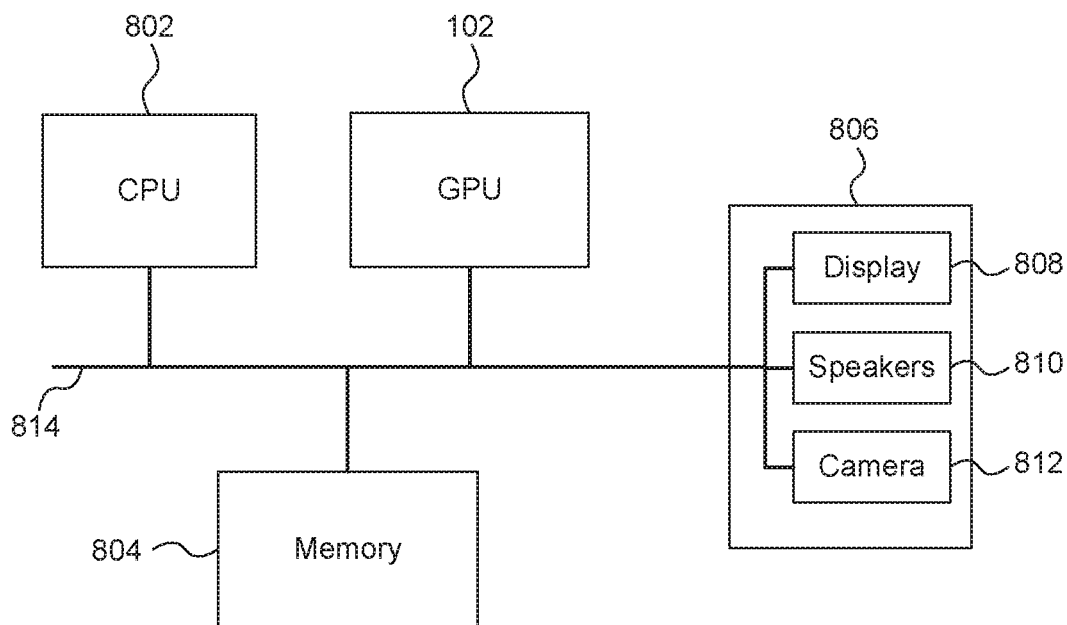
FIG. 8 shows a computer system in which a graphics processing unit is implemented.

FIG. 8 shows a computer system in which the compression and decompression units described herein may be implemented. The computer system comprises a CPU 802, the GPU 102, a memory 804 and other devices 806, such as a display 808, speakers 810 and a camera 812. The components of the computer system can communicate with each other via a communications bus 814. At least part of the memory 804 may be used as the memory 104 shown in FIG. 1.

The compression units and decompression units are described herein as comprising a number of functional blocks. This is schematic only and is not intended to define a strict division between different logic elements of such entities. Each functional block may be provided in any suitable manner. It is to be understood that intermediate values described herein as being formed by a compression unit or a decompression unit need not be physically generated by the compression unit or the decompression unit at any point and may merely represent logical values which conveniently describe the processing performed by the compression unit or the decompression unit between its input and output.

The compression units and decompression units described herein may be embodied in hardware on an integrated circuit. The compression units and decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods.

Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression unit and/or a decompression unit configured to perform any of the methods described herein, or to manufacture a compression unit and/or a decompression unit comprising any apparatus described herein. An integrated circuit definition dataset may be, for example, an integrated circuit description.

Therefore, there may be provided a method of manufacturing, at an integrated circuit manufacturing system, a compression unit and/or a decompression unit as described herein. Furthermore, there may be provided an integrated circuit definition dataset that, when processed in an integrated circuit manufacturing system, causes the method of manufacturing a compression unit and/or a decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression unit and/or a decompression unit will now be described with respect to FIG. 9.

Figure 9:
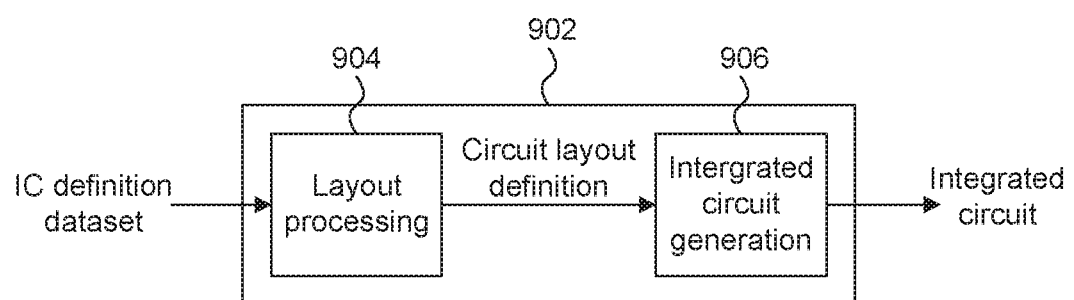
FIG. 9 shows an integrated circuit manufacturing system for generating an integrated circuit embodying a compression unit or a decompression unit as described herein.

FIG. 9 shows an example of an integrated circuit (IC) manufacturing system 902 which is configured to manufacture a compression unit and/or a decompression unit as described in any of the examples herein. In particular, the IC manufacturing system 902 comprises a layout processing system 904 and an integrated circuit generation system 906. The IC manufacturing system 902 is configured to receive an IC definition dataset (e.g. defining a compression unit and/or a decompression unit as described in any of the examples herein), process the IC definition dataset, and generate an IC according to the IC definition dataset (e.g. which embodies a compression unit and/or a decompression unit as described in any of the examples herein). The processing of the IC definition dataset configures the IC manufacturing system 902 to manufacture an integrated circuit embodying a compression unit and/or a decompression unit as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression unit and/or a decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing decompression to determine one or more image element values from compressed data, wherein the compressed data represents a block of image data comprising a plurality of image element values, each image element value comprising one or more data values relating to a respective one or more channels, the method comprising:
   reading, from the compressed data, an indication of an origin value for each of the one or more channels;
   reading, from the compressed data, for each of the one or more channels, an indication of a first number of bits for representing difference values which represent differences between the data values and the origin value for the channel;
   obtaining, for each of the one or more channels, a second number of bits, wherein representations of the difference values for each of the one or more channels are included in the compressed data using the second number of bits for that channel;
   using the obtained one or more second numbers of bits for the respective one or more channels to read the representations of the difference values for the one or more image element values being decompressed from the compressed data;
   based on the representations of the difference values read from the compressed data, determining, for each of the one or more channels and for each of the one or more image element values being decompressed, a difference value in accordance with said first number of bits for the channel; and
   for each of the one or more channels, determining the data value relating to the channel for each of the one or more image element values being decompressed using: (i) the origin value for the channel, and (ii) the determined difference value for the channel for the image element value.

2. The method of claim 1, wherein said determined difference value for a channel for an image element value has said first number of bits for the channel.

3. The method of claim 1, wherein said determining, for each of the one or more channels and for each of the one or more image element values being decompressed, a difference value in accordance with said first number of bits for the channel comprises adding zero, one or more least significant bits to the representations of the difference values read from the compressed data to thereby determine the difference values having said first number of bits for each of the one or more channels.

4. The method of claim 3, wherein the zero, one or more least significant bits which are added to the representations of the difference values read from the compressed data are all zeros.

5. The method of claim 3, wherein the zero, one or more least significant bits which are added to the representations of the difference values read from the compressed data are all ones.

6. The method of claim 3, wherein the zero, one or more least significant bits which are added to the representations of the difference values for a channel read from the compressed data are equal to a corresponding zero, one or more most significant bits of the origin value for the channel.

7. The method of claim 3, wherein the zero, one or more least significant bits which are added to the representations of the difference values read from the compressed data are random or pseudo-random bits.

8. The method of claim 3, wherein the zero, one or more least significant bits which are added to the representations of the difference values for a channel read from the compressed data are different for different ranges of origin values or for different ranges of difference values.

9. The method of claim 1, wherein the one or more second numbers of bits are determined to ensure that the compressed data satisfies a target level of compression for compressing the block of image data.

10. The method of claim 1, wherein said obtaining, for each of the one or more channels, a second number of bits comprises using the first number of bits for each of the one or more channels to determine the second number of bits for the channel in accordance with a predetermined scheme.

11. The method of claim 10, wherein the one or more second numbers of bits are determined to ensure that the compressed data satisfies a target level of compression for compressing the block of image data, and wherein said using the first number of bits for each of the one or more channels to determine the second number of bits for the channel in accordance with the predetermined scheme comprises determining whether representing the difference values for the one or more channels with the respective determined one or more first number of bits would satisfy the target level of compression,
   wherein if it is determined that representing the difference values for the one or more channels with the respective determined one or more first number of bits would satisfy the target level of compression then, for each of the one or more channels, the second number of bits equals the first number of bits for that channel, and
   wherein if it is determined that representing the difference values for the one or more channels with the respective determined one or more first number of bits would not satisfy the target level of compression then, for at least one of the one or more channels, the second number of bits is less than the first number of bits for that channel.

12. The method of claim 10, wherein there is a threshold number of bits for each of the one or more channels,
   wherein if a first number of bits for a channel is less than or equal to the threshold number of bits for the channel, then the second number of bits for the channel equals the first number of bits for the channel, and
   wherein if a first number of bits for a channel is greater than the threshold number of bits for the channel, then the second number of bits for the channel is within a range from the threshold number of bits for the channel to the first number of bits for the channel.

13. The method of claim 1, wherein said obtaining, for each of the one or more channels, a second number of bits comprises reading an indication of said second number of bits for the channel from the compressed data.

14. The method of claim 1, wherein said determining, for each of the one or more channels, the data value relating to the channel for each of the one or more image element values being decompressed comprises either: (i) summing the origin value for the channel and the determined difference value for the channel for the image element value, or (ii) subtracting the determined difference value for the channel for the image element value from the origin value for the channel.

15. The method of claim 1, wherein said determining, for each of the one or more channels, the data value relating to the channel for each of the one or more image element values being decompressed comprises combining the origin value for the channel and the determined difference value for the channel for the image element value using modular arithmetic.

16. The method of claim 1, wherein the compressed data comprises a plurality of origin values for at least one of the one or more channels, wherein an indication is included in the compressed data to indicate which of the plurality of origin values each of the difference values for said at least one of the one or more channels has been determined from,
wherein said determining, for said at least one of the one or more channels, the data value relating to the channel for each of the one or more image element values being decompressed comprises using: (i) the origin value for the channel indicated by the indication for the determined difference value for the channel for the image element value, and (ii) the determined difference value for the channel for the image element value.

17. The method of claim 1, wherein the compressed data is in a compressed block of data comprising:
a header portion, which has a fixed size, and which comprises the indication of the origin value and the indication of the first number of bits for each of the one or more channels; and
a body portion, which has a variable size, and which comprises the representations of the difference values for each of the one or more channels,
wherein the compressed block of data has a base address, and wherein the header portion starts at a first address defined by the base address, with the data of the header portion running in a first direction from the first address, and wherein the body portion starts at a second address defined by the base address, with the data of the body portion running in a second direction from the second address, wherein the first direction is opposite to the second direction in address space.

18. The method of claim 1, further comprising:
determining one or more error correction indications based on the determined data values of the one or more image element values being decompressed;
reading one or more error correction indications from the compressed data; and
comparing the determined one or more error correction indications with the one or more error correction indications read from the compressed data to determine whether there are errors in the determined data values of the one or more image element values being decompressed.

19. A decompression unit configured to perform decompression to determine one or more image element values from compressed data, wherein the compressed data represents a block of image data comprising a plurality of image element values, each image element value comprising one or more data values relating to a respective one or more channels, the decompression unit comprising:
data value determination logic configured to read, from the compressed data, an indication of an origin value for each of the one or more channels; and
difference value determination logic configured to:
read, from the compressed data, for each of the one or more channels, an indication of a first number of bits for representing difference values which represent differences between the data values and the origin value for the channel;
obtain, for each of the one or more channels, a second number of bits, wherein representations of the difference values for each of the one or more channels are included in the compressed data using the second number of bits for that channel;
use the obtained one or more second numbers of bits for the respective one or more channels to read the representations of the difference values for the one or more image element values being decompressed from the compressed data; and
based on the representations of the difference values read from the compressed data, determine, for each of the one or more channels and for each of the one or more image element values being decompressed, a difference value in accordance with said first number of bits for the channel;
wherein the data value determination logic is further configured to determine, for each of the one or more channels, the data value relating to the channel for each of the one or more image element values being decompressed using: (i) the origin value for the channel, and (ii) the determined difference value for the channel for the image element value.

20. A non-transitory computer readable storage medium having stored thereon a computer readable dataset description of an integrated circuit that, when processed in an integrated circuit manufacturing system, configures the integrated circuit manufacturing system to manufacture a decompression unit which is configured to perform decompression to determine one or more image element values from compressed data, wherein the compressed data represents a block of image data comprising a plurality of image element values, each image element value comprising one or more data values relating to a respective one or more channels, the decompression unit comprising:
data value determination logic configured to read, from the compressed data, an indication of an origin value for each of the one or more channels; and
difference value determination logic configured to:
read, from the compressed data, for each of the one or more channels, an indication of a first number of bits for representing difference values which represent differences between the data values and the origin value for the channel;
obtain, for each of the one or more channels, a second number of bits, wherein representations of the difference values for each of the one or more channels are included in the compressed data using the second number of bits for that channel;
use the obtained one or more second numbers of bits for the respective one or more channels to read the representations of the difference values for the one or more image element values being decompressed from the compressed data; and
based on the representations of the difference values read from the compressed data, determine, for each of the one or more channels and for each of the one or more image element values being decompressed, a difference value in accordance with said first number of bits for the channel;

wherein the data value determination logic is further configured to determine, for each of the one or more channels, the data value relating to the channel for each of the one or more image element values being decompressed using: (i) the origin value for the channel, and (ii) the determined difference value for the channel for the image element value.

* * * * *